United States Patent [19]
Taga et al.

[11] 4,277,457
[45] Jul. 7, 1981

[54] ALKALI CALCIUM SILICATES AND PROCESS FOR PREPARATION THEREOF

[75] Inventors: Genji Taga, Shinnanyo; Teruo Oikawa, Kudamatsu; Yoshiaki Watanabe, Hikari, all of Japan

[73] Assignee: Tokuyama Soda Kabushiki Kaisha, Yamaguchi, Japan

[21] Appl. No.: 54,810

[22] Filed: Jul. 5, 1979

[30] Foreign Application Priority Data

| Jul. 7, 1978 [JP] | Japan | 53/81935 |
| Jul. 11, 1978 [JP] | Japan | 53/83565 |
| Aug. 7, 1978 [JP] | Japan | 53/95397 |
| Sep. 21, 1978 [JP] | Japan | 53/115131 |
| Dec. 5, 1978 [JP] | Japan | 53/158639 |

[51] Int. Cl.³ .................................... C01B 33/24
[52] U.S. Cl. ............................. 423/331; 106/78; 106/288 B
[58] Field of Search ............. 423/331, 332; 106/78, 106/288 B; 253/457

[56] References Cited

U.S. PATENT DOCUMENTS

| 2,359,344 | 10/1944 | Winding | 423/331 |
| 2,364,015 | 11/1944 | Winding | 423/331 |
| 3,660,021 | 5/1972 | Olmsted et al. | 423/331 |
| 3,806,585 | 4/1974 | Takahashi et al. | 423/331 |

FOREIGN PATENT DOCUMENTS 415565  8/1934  United Kingdom ............. 106/78

*Primary Examiner*—Edward J. Meros
*Attorney, Agent, or Firm*—Sherman & Shalloway

[57] ABSTRACT

Disclosed is an alkali calcium silicate having two different X-ray diffraction patterns (1) with diffraction peaks at spacings (d) of 11.8–12.2 Å, 6 Å and 3 Å or (2) with diffraction peaks at spacings (d) of 13.0–13.4 Å, 6.7 Å and 3.1 Å. This silicate is in the fibrous or micaceous form and is valuable as a drying agent or an ion exchange agent. This silicate is prepared by hydrothermal reaction of an aqueous suspension having a specific composition of the starting components.

29 Claims, 8 Drawing Figures

ALKALI CALCIUM SILICATES AND PROCESS FOR PREPARATION THEREOF

This invention relates to a novel alkali calcium silicate and a process for the preparation thereof. More particularly, the invention relates to valuable sodium or potassium calcium silicate in the fibrous or micaceous form and an industrial process for the preparation thereof.

Reactions between silicon dioxide components have been studied for many years and calcium components, and it is known that various compounds can be prepared by these reactions. For example, calcium silicates composed of xonotlite, tobermorite and the like have been broadly used in the field of construction materials. However, reaction products formed from at least three components, that is, the silicon dioxide component, the alkali component and the calcium component, have hardly been proposed, and such reaction products having a peculiar fibrous or micaceous form are not known.

Our research on reactions between silicon dioxide components and calcium components has resulted in the discovery that if the silicon dioxide component, calcium component and alkali component are reacted under specific conditions, an alkali calcium silicate, which is a novel compound, can be obtained. Based on this finding, we have now completed the present invention.

The present invention will now be described in detail by reference to the accompanying drawings, in which.

Figure 1:
FIG. 1 is an electron microscope photograph of one instance of sodium calcium silicate of the type 12 Å having a micaceous form.

Alkali calcium silicates provided according to the present invention are divided into two types, each being crystalline and having a peculiar X-ray diffraction pattern.

One type has strong diffraction peaks at spacings (d) of 11.8–12.2 Å, 6 Å and 3 Å in the X-ray diffraction pattern (hereinafter referred to as "the type 12 Å"), and the other type has strong diffraction peaks at spacings (d) of 13.0–13.4 Å, 6.7 Å and 3.1 Å in the X-ray diffraction pattern (hereinafter referred to as "the type 13 Å").

The type 12 Å ordinarily has strong peaks also at 3.4 Å, 3.15 Å and 2.95 Å and the type 13 Å ordinarily has strong peaks also at 3.5 Å, 3.3 Å and 2.9 Å.

Each of the types 12 Å and 13 Å is represented by the following general formula:

$$aNa_2O \cdot bK_2O \cdot cCaO \cdot dSiO_2 \cdot eH_2O \tag{1}$$

wherein a is zero or a number larger than 0, b is zero or a number larger than 0, c is a number of from 7 to 9, d is a number of from 30 to 34 and e is a number of from 0 to 30, with the proviso that the sum of a and b is larger than 0 but smaller than or equal to 8.

The value of sum of a and b in the type 12 Å is ordinarily smaller than in the type 13 Å.

Typical instances of the type 12 Å are represented by the following general formula:

$$(2.5-3.5)R_2O \cdot (7-9)CaO \cdot 32SiO_2 \cdot mH_2O \tag{2}$$

wherein R is Na or K, or a part of R is Na and the remainder of R is K, and m is a number of from 0 to 30.

Typical instances of the type 13 Å are represented by the following general formula:

$$(5-6)R_2O \cdot (7-9)CaO \cdot 32SiO_2 \cdot mH_2O \tag{3}$$

wherein R and m are as defined above.

Most typical instances of the type 12 Å are represented by the following general formula:

$$3R_2O \cdot 8CaO \cdot 32SiO_2 \cdot nH_2O \tag{4}$$

wherein R is as defined above and n is a number of from 0 to 26.

Most typical instances of the type 13 Å are represented by the following general formula:

$$5.6R_2O \cdot 8CaO \cdot 32SiO_2 \cdot nH_2O \tag{5}$$

wherein R and n are as defined above.

These crystalline alkali calcium silicates of the present invention ordinarily include water of crystallization in the as-prepared state in such an amount that e in the general formula (1) is about 25, but the value of e is changed in the range of about 15 to about 30 in the as-prepared state according to reaction conditions.

When these alkali calcium silicates, especially those of the type 12 Å, are heated, water is isolated therefrom, and when they are heated at 250° to 300° C., they are ordinarily converted to anhydrous alkali calcium silicate. However, the anhydrous alkali calcium silicate is rendered hydrous again on contact with water and is converted to a hydrate represented by the above general formula (1). Properties of an anhydrous alkali calcium silicate formed by removal of water under heating are not substantially different from those of the corresponding hydrate. In this connection, water of the crystalline alkali calcium silicate is regarded as having properties of zeolitic water.

As pointed out hereinafter, when the alkali calcium silicate hydrate of the present invention is heated at about 250° to about 300° C., contained water is isolated therefrom, and the water-removed alkali calcium silicate is rendered hydrous again on contact with water. Accordingly, the alkali calcium silicate of the present invention can be used as a drying agent by utilizing this specific property.

Furthermore, the alkali calcium silicate of the present invention exerts an ion exchange capacity owing to $Na_2O$ and/or $K_2O$ shown in the above general formula. This property is peculiar to the alkali calcium silicate of the present invention and is not observed in other calcium silicate type compounds. The alkali calcium silicate of the present invention can be used as an ion exchange agent in various fields by utilizing this specific property, that is, the ion exchange capacity.

The alkali calcium silicate of the present invention can take three forms, that is, a fibrous form, a micaceous form and a mixed form thereof, according to the preparation conditions. In case of the fibrous form, fibers are ordinarily 20 to 300µ in length and the aspect ratio (length/diameter ratio) is about 50 to about 200. Fibers having a length exceeding 100µ may be obtained under some preparation conditions. The micaceous form is ordinarily obtained as an aggregate of flakes having a thickness of 0.05 to 0.2µ and a length of 5 to 100µ in one direction. A mixture of such fibrous and micaceous forms is obtained under some preparation conditions. It is industrially difficult to separate and recover one form from such mixture. Properties of the alkali calcium silicate are not changed by the difference of the form and the respective forms have substantially the same properties. An alkali calcium silicate having an intended form can be appropriately obtained by selecting a proper preparation process among various processes described hereinafter.

According to the present invention, there is also provided a composite of amorphous silica and a crystalline alkali calcium silicate. This composite is represented by the following general formula:

$$(aNa_2O.bK_2O.cCaO.dSiO_2.eH_2O).(mSiO_2.nH_2O) \quad (6)$$

wherein a, b, c, d and e are as defined above in the general formula (1), and m is a number larger than 0 and n is a number larger than 0.

Ordinarily, m is in the range of $30 > m > 0$ and n is in the range of $10 > n > 0$. It depends on the preparation conditions whether such composite or a crystalline alkali calcium silicate alone is obtained.

This amorphous silica-containing alkali calcium silicate may be converted to a single compound of the above-mentioned crystalline alkali calcium silicate by extracting amorphous silica with, for example, an aqueous solution of sodium hydroxide. It has not been elucidated in what form amorphous silica is included in the crystalline alkali calcium silicate in case of this amorphous silica-crystalline alkali calcium silicate composite. For example, even if this composite is observed by an electron microscope at 1000 magnifications, amorphous silica cannot be discriminated. Furthermore, by electron microscope observation, there cannot be found any difference of the form between the amorphous silica-crystalline alkali calcium silicate composite and the crystalline alkali calcium silicate. However, even if the crystalline alkali calcium silicate is blended with hydrous silica so-called "white carbon", that is, amorphous silicon dioxide, or this blend is subjected to a heat treatment under pressure, for example, it is heated at 200° C. in an autoclave for 20 hours, the amorphous silica-crystalline alkali calcium silicate composite of the present invention cannot be obtained. From the foregoing facts, we construe that in the composite of the present invention, amorphous silica is intruded in the crystalline alkali calcium silicate by ultra-microblending. It has not been elucidated what function amorphous silica exerts in formation of the alkali calcium silicate of the present invention.

The X-ray diffraction pattern of the crystalline alkali calcium silicate of the present invention is the same as that of the amorphous silica-alkali calcium silicate composite of the present invention. Accordingly, it can be judged that both the substances are identical from the crystallographic viewpoint. By the chemical analysis, it can be confirmed that the crystalline alkali calcium silicate and amorphous silica-crystalline alkali calcium silicate of the present invention are represented by the above general formulae. More specifically, by chemical analysis of the respective constituents, $Na_2O$ and/or $K_2O$, $CaO$ and $SiO_2$, it can be confirmed that the crystalline alkali calcium silicate of the present invention is represented by the above general formula (1). Furthermore, by extraction of amorphous silica and chemical analysis of the above constituents and the extracted amorphous silica, it can be confirmed that the amorphous silica/crystalline alkali calcium silicate composite of the present invention is represented by the above general formula (6).

When $Al_2O_3$ contained in the starting material is present in the reaction mixture, CaO of the formed alkali calcium silicate is substituted by this $Al_2O_3$ component, and 2 moles of CaO are ordinarily substituted by one mole of $Al_2O_3$. In this case, if correction of the alumina component is made in the following manner, the above-mentioned general formula can be derived. More specifically, when it is found by the chemical analysis that the alkali calcium silicate is composed of p moles of $Na_2O$, q moles of $K_2O$, r moles of CaO, s moles of $SiO_2$, t moles of $Al_2O_3$ and u moles of $H_2O$, correction is made according to the following correction formula:

Correction
Formula=$(cp/r+2s)Na_2O.(cq/r+2s)K_2O.c$-
$CaO.(ct/r+2s)SiO_2.(cu/r+2s)H_2O$ When calculation is made according to the above correction formula, it can be confirmed that the alkali calcium silicate of the present invention is represented by the above general formula (1) even if the alumina component is present.

The content of amorphous silica can be determined by extracting amorphous silica from the amorphous silica-crystalline alkali calcium silicate composite by caustic soda. Of course, in case of the crystalline alkali calcium silicate, amorphous silica is not extracted at all. The amount of water of crystallization is determined by subtracting the amount of water obtained by chemical analysis of the alkali calcium silicate from the amount of water obtained by chemical analysis of the amorphous silica-crystalline alkali calcium silicate composite. However, the amount of water of crystallization in amorphous silica is drastically changed in a broad range according to conditions as heretofore studied in the field of hydrous silica, and ordinarily, the amount of water of crystallization in amorphous silica is not specifically mentioned. However, in many cases, the amount of water of crystallization in amorphous silica is about 5 to about 7% by weight based on amorphous silica, and the amount of water of crystallization can be reduced by heating.

The process for the preparation of alkali calcium silicate of the present invention will now be described by reference to some typical embodiments. Of course, the preparation processes are not limited to those described hereinafter, and various modifications and changes may be made according to need.

In accordance with one embodiment of the present invention, there is provided a process for the preparation of alkali calcium silicates, which comprises subjecting an aqueous suspension of an alkali component, a calcium component and a silicon dioxide component to hydrothermal reaction under pressure, wherein the amounts of the alkali component, the calcium component and the silicon dioxide component in the aqueous suspension are arranged so that when an alkali metal salt is formed as a by-product by the reaction, the starting material charge coefficient T represented by the following formula:

$$T = (9Y - 32Z/9X - 12Z) \quad (A)$$

wherein X stands for the amount (moles) of $R_2O$ contained in the aqueous suspension, in which R is an alkali metal selected from the group consisting of sodium and potassium, Y stands for the amount (moles) of $SiO_2$ contained in the aqueous suspension and Z stands for the amount (moles) of CaO contained in the aqueous suspension, is in the range of from 1.2 to 3.0 and the alkalinity coefficient U represented by the following formula:

$$U = (3X - 4Z/3S) \quad (C)$$

wherein X and Z are as defined above and S stands for the amount (moles) of $H_2O$ contained in the aqueous suspension, is in the range of from 0.002 to 0.04, and when an alkali metal salt is not formed as a by-product by the reaction, the starting material charge coefficient T represented by the following formula:

$$T = (9Y - 32Z/9X - 3Z) \quad (B)$$

wherein X, Y and Z are as defined above, is in the range of from 1.2 to 3.0 and the alkalinity coefficient U represented by the following formula:

$$U = (3X - Z/3S) \quad (D)$$

wherein X, Z and S are as defined above, is in the range of from 0.002 to 0.04.

One preferred embodiment for the preparation of sodium calcium silicate will now be described in detail.

As is seen from the above-mentioned general formulae (1) to (5) of the alkali calcium silicate of the present invention, for the preparation of sodium calcium silicate, a silicon dioxide component, a calcium component and a sodium component are necessary as the starting materials. Starting substances giving one component, respectively, may be used. Furthermore, a starting substance giving at least two components may be used. In other words, starting substances are selected so that the starting suspension contains the sodium component, calcium component and silicon dioxide component. If only this requirement is satisfied, the kinds of the starting substances are not critical. As starting substance of the silicon dioxide, there are preferably employed hydrous silica so-called "white carbon", that is, silicon dioxide prepared by the wet process, such silicon dioxide as natural soluble silica or quartz, and a compound containing silicon dioxide. As described hereinafter, sodium silicate is especially preferably employed as the starting substance of the silicon dioxide component. From the industrial viewpoint, sodium hydroxide is preferably employed as the starting substance of the sodium component. Furthermore, use of abovementioned sodium silicate as the starting substance of the sodium component is preferred from the industrial viewpoint. When sodium silicate is used as the starting substance in the present invention, it acts not only as the starting substance giving the silicon dioxide component but also as the starting substance giving the sodium component. Therefore, sodium silicate is especially preferred as the starting substance from the industrial viewpoint. Any of substances containing calcium can be used as the starting substance giving the calcium component, so far as it is water-soluble under the conditions of hydrothermal reaction under pressure, which will be described in detail hereinafter. Ordinarily, there are preferably employed water-soluble calcium compounds such as calcium hydroxide, calcium oxide, calcium chloride, calcium nitrate and calcium sulfate. By the term "water-soluble" used herein is meant a property that the calcium compound is dissolved in water in the above-mentioned reaction system. For example, calcium sulfate which is not sufficiently dissolved at the step of mixing the starting substances can be used in the present invention, because it is dissolved in water under the reaction conditions in an amount corresponding to the amount of calcium consumed for formation of sodium calcium silicate. However, when a hardly soluble calcium compound, such as calcium carbonate, is used, the reaction speed is very low and it takes several days to complete the reaction under some reaction conditions. Therefore, such hardly soluble calcium compound is not preferred as the starting substance from the economical viewpoint. When such a calcium salt as calcium chloride, calcium nitrate or calcium sulfate is employed, the salt reacts with the above-mentioned sodium component to form a sodium salt such as sodium chloride, sodium nitrate or sodium sulfate as a by-product. Such by-product can be separated from sodium calcium silicate of the present invention by utilizing the difference of the solubility in some case, but when it is necessary to completely remove a small amount of the by-product, the above-mentioned calcium salt is not preferred as the starting substance. When calcium hydroxide or calcium oxide is used as the starting substance of the calcium component, such by-product is not formed ordinarily. Accordingly, in order to prevent incorporation of the by-product, such calcium compounds as $Ca(OH)_2$ and CaO are most preferred as the starting substance of the calcium component.

The order of addition of the foregoing starting substances of the respective components is not particularly critical in the present invention. The starting substances may be added simultaneoously or separately to an aqueous medium. Moreover, aqueous solutions or suspensions formed by adding the starting substances in aqueous media separately may be mixed together. The resulting mixture ordinarily takes the form of an aqueous suspension containing the silicon dioxide component, the sodium component and the calcium component, irrespectively of the mixing method. The concentration of each component in the aqueous medium is not particularly critical and an appropriate concentration may be chosen, so far as hydrothermal reaction is possible. In order to obtain sodium calcium silicate at a high efficiency on an industrial scale, it is ordinarily preferred that the reaction be carried out in a reaction system where the silicon dioxide and sodium components are richer than the calcium component.

Preferred conditions for preparing sodium calcium silicate of the present invention at a high efficiency on an industrial scale will now be described.

As pointed out hereinbefore, when the respective starting substances are added to an aqueous medium, an aqueous suspension is ordinarily formed. In the present invention, it is most preferred that the starting substances of the respective components be added to an aqueous medium in such amounts that when a sodium salt is formed as a by-product by the reaction, the starting material charge coefficient T represented by the following formula:

$$T = (9Y - 32Z/9X - 12Z) \quad (A)$$

wherein X stands for the amount (moles) of $N_2O$ contained in the aqueous suspension, Y stands for the amount (moles) of $SiO_2$ contained in the aqueous suspension and Z stands for the amount (moles) of CaO contained in the aqueous suspension, is in the range of from 1.2 to 3.0 and the alkalinity coefficient U represented by the following formula:

$$U = (3X - 4Z/3S) \quad (C)$$

wherein X and Z are as defined above and S stands for the amount (moles) of $H_2O$ contained in the aqueous suspension, is in the range of from 0.002 to 0.04, particularly 0.002 to 0.01, and when a sodium salt is not formed as a by-product by the reaction, the starting material charge coefficient T represented by the following formula:

$$T = (9Y - 32Z/9X - 3Z) \quad (B)$$

wherein X, Y and Z are as defined above, is in the range of from 1.2 to 3.0 and the alkalinity coefficient U represented by the following formula:

$$U = (3X - Z/3S) \quad (D)$$

wherein X, Z and S are as defined above, is in the range of from 0.002 to 0.04, particularly 0.002 to 0.01.

In each of the foregoing formulae (A) through (D), each of the denominator and the numerator is regarded as a positive number.

The case where a sodium salt is formed as a by-product means the case where a sodium salt derived from the above-mentioned calcium compound, such as calcium chloride, calcium sulfate or calcium nitrate, is formed as a by-product, that is, such calcium compound is used as the starting substance, and the case where a sodium salt is not formed as a by-product means the case where calcium hydroxide or calcium oxide is used as the starting substance of the calcium component.

It has not been elucidated what functions the above-mentioned starting material charge coefficient T and the alkalinity coefficient U exert on the reaction of forming sodium calcium silicate. The formula of calculation of the starting material charge coefficient T is an empirical formula derived based on results of various experiments made by us. When the starting material charge coefficient T is smaller than the lower limit, the speed of the reaction of forming sodium calcium silicate is low and several days to ten-odd days are required for completion of the reaction in some case. Accordingly, the preparation becomes industrially disadvantageous. When the starting material charge coefficient T exceeds the above-mentioned upper limit, amorphous silica or quartz is formed as a by-product in a large quantity, and separation of such by-product from intended sodium calcium silicate becomes difficult. Therefore, if incorporation of a by-product is not desired, adoption of such a large value of the starting material charge coefficient T is not preferred. In order to obtain intended sodium calcium silicate alone, it is preferred that the starting material charge coefficient T be adjusted to less than 2.5, though this critical value varies to some extent depending on the kinds of the starting substances and the reaction conditions. Accordingly, from the industrial viewpoint, it is preferred that the starting material charge coefficient T be selected in the range of from 1.2 to 2.5. The alkalinity coefficient U may be selected in the range of 0.002 to 0.04, particularly 0.002 to 0.01. Ordinarily, if the alkalinity coefficient U is smaller than the lower limit, the speed of the reaction of forming sodium calcium silicate is low, and the preparation becomes industrially disadvantageous. If the alkalinity coefficient U exceeds the above upper limit, the amount of the unreacted sodium component is increased and the equipment can hardly be operated at a high efficiency. Moreover, circulation of the unreacted sodium component involves troubles.

Standard values indicating the preferred ranges of the starting material charge coefficient T and the alkalinity coefficient U, which have been described hereinbefore, vary depending on the kinds of the starting substances and the reaction conditions and cannot be simply determined. Accordingly, it is preferred that optimum values be determined according to the kinds of the starting substances and the reaction conditions in advance of the reaction.

Conditions for the preparation of an alkali calcium silicate of the type 12 Å or 13 Å of the present invention differ depending on the kind of the alkali silicate component to be used and the hydrothermal reaction temperature t (°C.).

For example, when the silicon dioxide component is a water-soluble silicon dioxide component and the hydrothermal reaction is carried out at t° C., if the reaction is carried out under conditions satisfying any one of requirements defined by the following formula combinations (E), (F) and (G):

$$\left. \begin{array}{l} 1.2 \leq T \leq 0.00533t + 0.4 \\ U \leq 0.01 \end{array} \right\} (E)$$

$$\left. \begin{array}{l} 0.00533t + 0.4 < T \leq 0.008t + 0.8 \\ 0.002 \leq U \leq 0.0002t - 0.025 \end{array} \right\} (F)$$

$$\left. \begin{array}{l} 0.008t + 0.8 < T \leq 3.0 \\ 0.002 \leq U \leq 0.04 \end{array} \right\} (G)$$

and at a temperature of 150° to 250° C., an alkali calcium silicate of the type 12 Å is obtained. Under conditions satisfying the requirement defined by the formula combination (G), the above-mentioned amorphous silica-crystalline alkali calcium silicate composite is formed. Incidentally, in the above formula combinations (E), (F) and (G), as well as in combination formulae (H) through (L) given below, T and U stand for the above-mentioned starting material coefficient and alkalinity coefficient, respectively, and t stands for the hydrothermal reaction temperature (°C.).

When the silicon dioxide component is a water-soluble silicon dioxide component and the hydrothermal reaction is carried out at t° C., if the hydrothermal reaction is carried out under conditions satisfying the requirement defined by the following formula combination (H):

$$0.00533t + 0.4 \leq T \leq 0.008t + 0.8 \atop 0.0002t - 0.025 < U \leq 0.04 \Bigg\} (H)$$

and at a temperature of 150° to 250° C., an alkali calcium silicate of the type 13 Å is obtained.

When the silicon dioxide component is a hardly soluble silicon dioxide component and the hydrothermal reaction is carried out at t° C., if the hydrothermal reaction is carried out under conditions satisfying any one of requirements defined by the following formula combinations (I), (J) and (K):

$$1.2 \leq T \leq 0.006t + 0.15 \atop U \leq 0.01 \Bigg\} (I)$$

$$0.006t + 0.15 < T \leq 0.008t + 0.6 \atop 0.01 \leq U \leq 0.00008t - 0.008 \Bigg\} (J)$$

$$0.008t + 0.6 < T \leq 3.0 \atop 0.002 \leq U \leq 0.04 \Bigg\} (K)$$

and at a temperature of 150° to 250° C., an alkali calcium silicate of the type 12 Å is obtained. Under conditions satisfying the requirement defined by the formula combination (K), the above-mentioned amorphous silica-crystalline alkali calcium silicate composite is obtained.

When the silicon dioxide component is a hardly soluble silicon dioxide component and the hydrothermal reaction is carried out at t° C., if the hydrothermal reaction is carried out under conditions satisfying the requirement defined by the following formula combination (L):

$$0.006t + 0.015 \leq T \leq 0.008t + 0.6 \atop 0.00008t - 0.008 < U \leq 0.04 \Bigg\} (L)$$

and at a temperature of 150° to 250° C., an alkali calcium silicate of the type 13 Å is obtained.

In the above-mentioned first embodiment of the present invention, the resulting sodium calcium silicate is crystalline sodium calcium silicate in the micaceous form, crystalline sodium calcium silicate in the fibrous form, an amorphous silica-sodium calcium silicate composite in the micaceous form or a mixture thereof. The reason why the crystalline sodium calcium silicate is in the micaceous form or in the fibrous form or why it sometimes contains an amorphous silica has not been known, but as a result of experiments made by us, it has been confirmed that the form of the resulting sodium calcium silicate is influenced to some extent by the ratio of the starting components in the aqueous suspension. More specifically, if the above-mentioned starting material charge coefficient T exceeds 2.5, the resulting product is a composite of crystalline sodium calcium silicate in the micaceous form and amorphous silica. When the starting material charge coefficient T is not larger than 2.5 and the alkalinity coefficient U is not larger than 0.004, the product is crystalline sodium calcium silicate. When the starting material charge coefficient T is not larger than 2.5 and the alkalinity coefficient U is at least 0.005, crystalline sodium calcium silicate in the micaceous form is obtained. When the starting material charge coefficient T is not larger than 2.5 and the alkalinity coefficient U is in the range of from 0.004 to 0.005, a mixture of crystalline sodium calcium silicate in the fibrous form and crystalline sodium calcium silicate in the micaceous form is obtained.

In the reaction of forming sodium calcium silicate according to the above-mentioned embodiment of the present invention, the aqueous suspension containing the silicon dioxide component, the sodium component and the calcium component is subjected to hydrothermal reaction under pressure. The temperature for the hydrothermal reaction is not particularly critical, so far as sodium calcium silicate is formed at the temperature adopted. From the industrial viewpoint, however, it is most preferred that the hydrothermal reaction be carried out at 150° to 250° C. At too low a temperature, a long time is necessary for formation of sodium calcium silicate, and at too high a temperature, the pressure resistance of a reaction vessel should be increased, and the running cost is inevitably increased. Ordinarily, the reaction is carried out under a vapor pressure at the reaction temperature adopted, and an inert gas need not be particularly used for pressurization. Generally, sodium calcium silicate can be obtained in a good yield if the reaction is carried out in a sealed vessel such as an autoclave at the above-mentioned temperature. The reaction time varies depending on the kinds of the starting substances and the reaction conditions and it cannot be simply determined. Generally, however, good results are obtained when the reaction is conducted for about 10 minutes to about 40 hours. In many cases, the reaction time is influenced by the starting substance of the sodium dioxide component. For example, when hydrous silica, natural soluble silica or sodium silicate is used, good results are obtained if the reaction is conducted within 20 hours. In order to maintain the homogeneous dispersion state and prevent agglomeration or caking, it is preferred that the reaction be carried out while agitating the suspension.

Various sodium calcium silicates differing in the form according to the composition of the starting substances can be obtained by the above-mentioned hydrothermal reaction. The sodium calcium silicate obtained by the hydrothermal reaction can easily be separated from the reaction mixture by filtration, and the separated sodium calcium silicate is washed with water according to need and is dried to obtain a final product. When amorphous silica-containing sodium calcium silicate is obtained by the hydrothermal reaction, it can be converted to crystalline sodium calcium silicate by extracting amorphous silica after separation by filtration or after drying. Means for extracting amorphous silica is not particularly critical, and known methods may be adopted. Generally, amorphous silica can be sufficiently removed by extraction if the reaction product is caused to fall in contact with an aqueous solution of an alkali hydroxide having a normality N of 0.2 to 1.0. As pointed out hereinbefore, the sodium portion of sodium calcium silicate has an ion exchange capacity. Accordingly, in some case, the sodium portion is ion-exchanged with the alkali of the alkali hydroxide used for extraction and an alkali calcium silicate is formed. Therefore, it is ordinarily preferred that sodium hydroxide be used for extraction, unless a special alkali calcium silicate is desired.

The filtrate left after recovery of the reaction product by filtration does not substantially contain the calcium component, as is seen from results obtained in Examples given hereinafter. However, the majority of the silicon dioxide and sodium components used in excessive amounts is left in the filtrate in the form of sodium silicate. Accordingly, a part or all of the filtrate may be recycled and used as the starting material again. When calcium hydroxide or calcium oxide is used as the starting substance of the calcium component, since a by-product is not formed in the sodium calcium silicate-forming reaction, the filtrate can ordinarily be recycled directly to the reaction vessel and used for the reaction again. When calcium chloride, calcium nitrate or calcium sulfate is used as the starting substance of the calcium component, a sodium salt is formed as a by-product by the reaction. In the case where such sodium salt is formed as a by-product, if the filtrate is recycled and used again, the sodium salt is accumulated and it is gradually precipitated according to the solubility. Accordingly, if a sodium salt is formed as a by-product, it is preferred that the sodium salt be removed from a part or all of the filtrate and the filtrate be then recycled as the starting material. The means for removal of the sodium salt from the filtrate is not particularly critical and the sodium salt may be removed by known means. For example, it is preferred to adopt a method in which the filtrate is cooled below the solubility point of the sodium salt formed as a by-product and a necessary amount of the sodium salt is removed by filtration.

As will be apparent from the above-mentioned general formula of sodium calcium silicate of the present invention, the silicon dioxide component in the suspension is ordinarily consumed for the reaction in an amount larger than the amount consumed of the sodium component. Accordingly, the ratio of the unreacted silicon dioxide and sodium components in the filtrate is ordinarily different from the ratio of both the components in the starting suspension. In such case, it is preferred that the ratio of starting materials to be freshly added be changed and adjusted so that the predetermined ratio is attained in the suspension. Ordinarily, good results are obtained when hydrous silica or terra abla is added to the filtrate and the filtrate is then recycled. Especially when sodium silicate is used as the sodium component and the silicon oxide component, there is industrially advantageously adopted a method in which hydrous silica or natural soluble silica is added to the filtrate to adjust the $SiO_2/Na_2O$ ratio.

For the production of potassium calcium silicate, the hydrothermal reaction is carried out under the same conditions as described above with respect to the preparation of sodium calcium silicate except that a starting substance of the potassium component such as potassium hydroxide or potassium silicate is used instead of the above-mentioned starting substance of the sodium component. When the starting substance of the potassium component is used and the hydrothermal reaction is carried out under the above-mentioned conditions, crystalline potassium calcium silicate in the fibrous form is always obtained. Accordingly, if it is desired to obtain potassium calcium silicate in the micaceous form, there is adopted a process in which sodium calcium silicate obtained according to the above-mentioned process is caused to fall in contact with an aqueous solution containing a potassium component to ion-exchange the sodium component in the sodium calcium silicate with the potassium component. Of course, potassium calcium silicate in the fibrous form may be prepared by subjecting sodium calcium silicate in the fibrous form to the above-mentioned ion-exchange treatment.

Of course, both the potassium and sodium components may be used in combination instead of the sodium or potassium component alone. In this case, potassium sodium calcium silicate in the fibrous form is always obtained. When the content of the sodium component in the total alkali component is high, that is, when the Na/(Na+K) molar ratio is at least 0.8, potassium sodium calcium silicate is sometimes formed.

In accordance with another embodiment of the process of the present invention, the intended crystalline alkali calcium silicate is prepared by using an alkali carbonate as the alkali component. This embodiment will now be described.

When sodium carbonate is used as the alkali component to form sodium calcium silicate, a compound containing silicon dioxide, sodium carbonate and a water-soluble calcium compound are added to an aqueous medium and the resulting suspension is subjected to hydrothermal reaction under pressure at a temperature of 150° to 250° C. In this case, it is preferred that the amounts of the above three components in the aqueous medium be adjusted so that the molar ratio of $SiO_2$ in the suspension to CaO in the suspension is in the range of from 3.0 to 4.0 and that when a sodium salt other than sodium bicarbonate is formed as a by-product, the alkalinity coefficient U' represented by the following formula:

$$U' = (1.5X - Z/3S) \quad (M)$$

wherein X stands for the amount (moles) of $Na_2O$ in the suspension, Z stands for the amount (moles) of CaO in the suspension and S stands for the amount (moles) of $H_2O$ in the suspension, is in the range of from 0.002 to 0.01 and when a sodium salt other than sodium bicarbonate is not formed as a by-product, the alkalinity coefficient U' is represented by the following formula:

$$U' = (1.5X - 4Z/3S) \quad (N)$$

wherein X, Z and S are as defined above, is in the range of from 0.002 to 0.01.

When potassium carbonate is used as the alkali carbonate component and potassium calcium silicate is prepared, a compound containing silicon dioxide, potassium carbonate and a water-soluble calcium compound are added to an aqueous medium and the resulting aqueous suspension is subjected to hydrothermal reaction under pressure at a temperature of 150° to 250° C. In this case, it is preferred that the amounts of the starting substances be adjusted so that the $SiO_2/CaO$ molar ratio in the suspension is the range of from 3.0 to 4.0 and that when a potassium salt other than potassium bicarbonate is formed as a by-product, the $K_2O/CaO$ molar ratio in the suspension is in the range of from 4 to 12 and when a potassium salt other than potassium bicarbonate is not formed, the $K_2O/CaO$ molar ratio in the suspension is in the range of from 2 to 10.

The novel alkali calcium silicate of the present invention can be prepared at a relatively low cost according to the hydrothermal reaction, and it can be used advantageously in various fields by utilizing the above-mentioned specific form and properties. For example, a product may be advantageously used as a reinforcer or filler for various resins and rubbers, mortar, gypsum, plaster and the like. When the alkali calcium silicate of the present invention is treated with an acid, there can be obtained amorphous silica retaining the original form, that is, amorphous silica in the fibrous or micaceous form, and this amorphous silica may be applied to the above-mentioned uses. Moreover, as pointed out hereinbefore, the alkali calcium silicate of the present invention may be advantageously used as a drying agent or an ion exchange agent.

The present invention will now be described in detail by reference to the following Examples that by no means limit the scope of the invention.

EXAMPLE 1

Under atmospheric pressure, 100 cc of an aqueous solution containing 1.0 mole/l of sodium silicate ($SiO_2$/$Na_2O$ molar ratio=2.5) was mixed with 100 cc of an aqueous slurry containing 0.25 mole/l of slaked lime at a temperature of 25° C. In this case, the starting material charge coefficient T calculated by the above formula (B) was 1.76 and the alkalinity coefficient U calculated by the above formula (D) was 0.0086. The resulting slurry was charged and sealed in an autoclave having an inner capacity of 300 ml, and reaction was carried out at 200° C. for 20 hours under agitation with an electromagnetic stirrer. After completion of the reaction, the reaction mixture was taken out from the autoclave and filtered and the recovered reaction product was washed 3 times with 100 cc of deionized water and dried at 100° C. for 8 hours.

The amount of the obtained dry product was 8.9 g. When the product was analyzed according to the method of JIS R-3101, it was found that the product was composed of 6.1% of $Na_2O$, 15.7% of CaO, 62.8% of $SiO_2$, 0.7% of $Al_2O_3$ and 14.7% of $H_2O$. When the alumina correction was made according to the method described hereinbefore, it was found that the product was represented by the composition formula $3Na_2O.9CaO.32SiO_2.25H_2O$. When 1 g of this product was treated with a 0.5 N NaOH aqueous solution at 80° C. for 1 hour, any substance was hardly dissolved out. Accordingly, it was confirmed that the product was substantially free of impurities such as amorphous silica. When the product was photographed at 1000 magnifications by using an electron microscope (Model JSM-50A manufactured and sold by Nippon Denshi Kabushiki Kaisha), a photo shown in FIG. 1 was obtained. As is seen from FIG. 1, the product was composed of substantially square micaceous flakes having one side length of about 30$\mu$ and a thickness smaller than 0.1$\mu$. Powder of this product was subjected to X-ray diffractiometry with $CuK\alpha$ at $2\theta$ of 5°–50° by using an X-ray diffractometer (Model Rotaflex PL 200 manufactured and sold by Rigaku Denki Kabushiki Kaisha). The obtained X-ray diffraction pattern diagram is shown in FIG. 2. From FIG. 2, it will be understood that the product had the diffraction peaks at 12 Å, 6 Å and 3 Å and had a novel crystal structure heretofore not reported.

When the filtrate left after recovery of the reaction product was analyzed, the presence of sodium silicate was confirmed but the calcium component was hardly detected.

EXAMPLE 2

Under atmospheric pressure, 100 cc of an aqueous solution containing 0.4 mole/l of sodium silicate ($SiO_2$/$Na_2O$ molar ratio=3.48) was mixed with 100 cc of an aqueous slurry containing 0.25 mole/l of slaked lime at a temperature of 25° C. In this case, the starting material charge coefficient T calculated according to the formula (B) was 1.6 and the alkalinity coefficient U calculated according to the formula (D) was 0.003. The resulting slurry was reacted and treated in the same manner as described in Example 1 to obtain 8.7 g of a dry product.

Figure 3:
FIG. 3 is an electron microscope photograph of one instance of sodium calcium silicate of the type 12 Å having a fibrous form.
Figure 4:
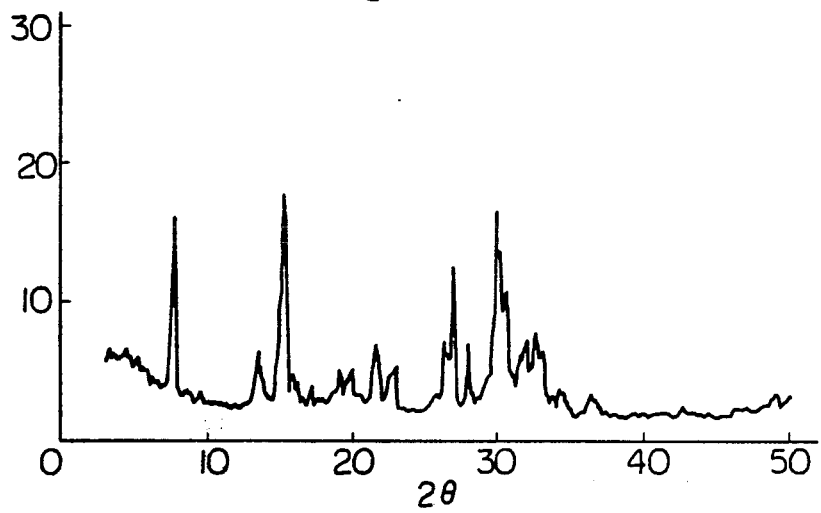
FIG. 4 is a diagram illustrating the X-ray diffraction pattern of the sodium calcium silicate shown in FIG. 3.

When the product was subjected to chemical analysis, it was found that the product was composed of 6.1% of $Na_2O$, 16.1% of CaO, 62.8% of $SiO_2$, 0.33% of $Al_2O_3$ and 14.6% of $H_2O$. By the above-mentioned alumina correction, the product was found to have a composition of $3Na_2O.9CaO.32SiO_2.25H_2O$. When the product was treated with a 0.5 N NaOH aqueous solution at 80° C. for 1 hour, any substance was not substantially dissolved out. Thus, it was confirmed that the product was free of impurities such as amorphous silica. A photograph of the product taken at 1000 magnifications by using an electron microscope is shown in FIG. 3. From FIG. 3, it is seen that the product was composed of fibers having a length of 30 to 40$\mu$ and a diameter of 0.7 to 2$\mu$. An X-ray diffraction pattern of the powder of the product is shown in FIG. 4, which is not substantially different from the X-ray diffraction pattern shown in FIG. 2. Accordingly, it was confirmed that the product had a novel crystal structure.

EXAMPLE 3

Under atmospheric pressure, 100 cc of an aqueous solution containing 0.72 mole/l of sodium silicate ($SiO_2$/$Na_2O$ molar ratio=3.62) was mixed with 100 cc of an aqueous slurry containing 0.25 mole/l of slaked lime at a temperature of 25° C. In this case, the starting material charge coefficient T calculated according to the formula (B) was 2.7 and the alkalinity coefficient U calculated according to the formula (D) was 0.006. The resulting slurry was sealed in an autoclave, reacted at 200° C. for 20 hours and treated in the same manner as described in Example 1 to obtain a dry product.

When the product was subjected to chemical analysis, it was found that the product was composed of 4.7% of $Na_2O$, 12.6% of CaO, 70.6% of $SiO_2$, 0.2% of $Al_2O_3$ and 11.8% of $H_2O$. The product was treated with a 0.5 N NaOH aqueous solution at 80° C. for 1 hour, washed with water and dried. When the alkali-treated product was subjected to chemical analysis, it was found that the product was composed of 6.1% of $Na_2O$, 16.2% of CaO, 62.8% of $SiO_2$, 0.2% of $Al_2O_3$ and 14.7% of $H_2O$.

By the above-mentioned alumina correction, the product was found to have a composition of $3Na_2O.9CaO.32SiO_2.25H_2O$ after the alkali treatment and a composition of $(3Na_2O.9CaO.32SiO_2.25H_2O)(14.2SiO_2.0.8H_2O)$ before the alkali treatment. Both the X-ray diffraction patterns of the product before the alkali treatment and the alkali-treated product were substantially the same as that shown in FIG. 2. By the electron microscope observation, it was found that no substantial change was caused in the crystal structure and the product was composed of micaceous flakes having one side length of about 2$\mu$.

EXAMPLE 4

Sodium hydroxide (chemical of special grade, manufactured by Wako Junyaku) and calcium chloride dihydrate (chemical of special grade, manufactured by Wako Junyaku) were added to 190 cc of water so that the molar composition shown in Table 2 was obtained, to form a homogeneous slurry. Then, anhydrous silica (Aerosil 200) was added in a molar amount shown in Table 1 to the slurry. The resulting slurry was charged and sealed in an autoclave and reacted at 200° C. for 20 hours. The post treatments were carried out in the same manner as described in Example 1 to obtain a dry product. Obtained results are shown in Table 1. By the chemical analysis, it was confirmed that each of the products obtained in Runs Nos. 1 and 2 had a composition of $3Na_2O.9CaO.32SiO_2.25H_2O$ and the product obtained in Run No. 3 had a composition of $(3Na_2O.9CaO.32SiO_2.25H_2O)(4.2SiO_2.0.71H_2O)$. By the chemical analysis, it was also confirmed that the content of $Al_2O_3$ was less than 0.001% in each product.

TABLE 1

|  | Run No. 1 | Run No. 2 | Run No. 3 |
|---|---|---|---|
| Composition of Suspension |  |  |  |
| $SiO_2$ (mole) | 0.143 | 0.197 | 0.261 |
| $Na_2O$ (mole) | 0.065 | 0.097 | 0.097 |
| CaO (mole) | 0.025 | 0.025 | 0.025 |
| Starting Material Charge Coefficient T | 1.7 | 1.7 | 2.7 |
| Alkalinity Coefficient U | 0.003 | 0.006 | 0.006 |
| Amount (g) of Product | 8.5 | 8.5 | 9.3 |
| Chemical Analysis Values (%) |  |  |  |
| $Na_2O$ | 6.1 | 6.1 | 5.6 |
| CaO | 16.5 | 16.5 | 15.2 |
| $SiO_2$ | 62.7 | 62.8 | 65.3 |
| $H_2O$ | 14.7 | 14.6 | 13.9 |
| Form | fibrous | micaceous | micaceous |
| Maximum Size ($\mu$) of Crystal | 40 | 30 | 10 |

EXAMPLE 5

Anhydrous silica (Aerosil 200) was mixed with anhydrous sodium carbonate (chemical of special grade, manufactured by Wako Junyaku) so that the $SiO_2/Na_2O$ molar ratio was 2.7. The mixture was calcined at 1000° C. for 2 hours to obtain water glass. The water glass was pulverized and water was added thereto in an amount enough to form an aqueous solution containing 1.0 mole/l of sodium silicate. The mixture was charged in an autoclave and the water glass was dissolved in water. The formed solution was filtered to obtain an aqueous solution containing 1.0 mole/l of sodium silicate ($SiO_2/Na_2O$ molar ratio=2.7). Then, sodium hydroxide (chemical of special grade, manufactured by Wako Junyaku) and water were added to the so obtained aqueous solution to form an aqueous solution containing 1.0 mole/l of sodium silicate ($SiO_2/Na_2O$ molar ratio=2.0). The aqueous solution of sodium silicate was mixed with an aqueous solution of calcium chloride dihydrate (chemical of special grade, manufactured by Wako Junyaku), if necessary further with water, under atmospheric pressure at 25° C. so that the composition shown in Table 2 was obtained. On mixing, white precipitates were formed and the mixture was converted to a slurry. The slurry was charged and sealed in an autoclave and reacted at 200° C. for 20 hours. The post treatments were carried out in the same manner as described in Example 1 to obtain a dry product. Obtained results are shown in Table 2. By the chemical analysis, it was confirmed that each of the products obtained in Runs Nos. 1 and 2 had a composition of $3Na_2O.8CaO.32SiO_2.25H_2O$ and the product obtained in Run No. 3 had a composition of $(3Na_2O.8CaO.32SiO_2.25H_2O)-(5.3SiO_2.0.65H_2O)$. By the chemical analysis, it was also confirmed that the content of $Al_2O_3$ was less than 0.001% in each product.

TABLE 2

|  | Run No. 1 | Run No. 2 | Run No. 3 |
|---|---|---|---|
| Composition of Suspension |  |  |  |
| $SiO_2$ (mole) | 0.141 | 0.194 | 0.262 |
| $Na_2O$ (mole) | 0.070 | 0.097 | 0.097 |
| CaO (mole) | 0.025 | 0.025 | 0.025 |
| Starting Material Charge Coefficient T | 1.42 | 1.65 | 2.7 |
| Alkalinity Coefficient U | 0.0035 | 0.006 | 0.006 |
| Amount (g) of Product | 8.5 | 8.5 | 9.4 |
| Chemical Analysis Values (%) |  |  |  |
| $Na_2O$ | 6.2 | 6.1 | 5.6 |
| CaO | 14.8 | 14.9 | 13.5 |
| $SiO_2$ | 64.1 | 63.9 | 67.3 |
| $H_2O$ | 14.9 | 15.1 | 13.9 |
| Form | fibrous | micaceous | micaceous |
| Maximum Size ($\mu$) of | 40 | 30 | 7 |

EXAMPLE 6

The reaction was carried out in the same manner as described in Example 1 except that the starting material ratio and reaction conditions were changed as indicated in Table 3. Obtained results are shown in Table 3. Incidentally, in each Run, the amount charged of CaO was 0.025 mole/l, and water was charged in such an amount that the total volume was 190 cc. In all the products other than the product of Run No. 5, the chemical composition after the alumina correction was substantially $3Na_2O.9CaO.32SiO_2.25H_2O$. By the chemical analysis and alkali treatment, the product of Run No. 5 was found to have a composition of $(3Na_2O.8CaO.32SiO_2.25H_2O)(4SiO_2.0.7H_2O)$.

TABLE 3

|  | Run No. | | | | | | | | | | |
|---|---|---|---|---|---|---|---|---|---|---|---|
|  | 1 | 2 | 3 | 4 | 5 | 6 | 7 | 8 | 9 | 10 | 11 |
| Amount (mole) of Sodium Silicate | 2.39 | 2.74 | 3.09 | 3.45 | 3.80 | 3.84 | 3.34 | 1.59 | 2.74 | 2.74 | 2.74 |
| $Na_2O$/CaO Molar Ratio | 2.88 | 2.88 | 2.88 | 2.88 | 2.88 | 1.39 | 1.82 | 3.30 | 2.88 | 2.88 | 2.88 |
| Starting Material Charge Coefficient T | 1.3 | 1.7 | 2.1 | 2.5 | 2.9 | 1.7 | 1.7 | 1.7 | 1.7 | 1.7 | 1.7 |
| Alkalinity Coefficient U | 0.006 | 0.006 | 0.006 | 0.006 | 0.006 | 0.0025 | 0.0035 | 0.007 | 0.006 | 0.006 | 0.006 |
| Temperature (°C.) | 175 | 175 | 175 | 175 | 175 | 175 | 175 | 175 | 160 | 200 | 230 |
| Time (hours) | 20 | 20 | 20 | 20 | 20 | 20 | 20 | 20 | 20 | 20 | 15 |
| Amount (g) of Product | 8.6 | 8.8 | 8.8 | 8.9 | 9.5 | 8.6 | 8.6 | 8.8 | 8.9 | 8.8 | 8.9 |
| Form | M | M | M | M | M | F | F | M | M | M | M |
| Maximum Size | 15 | 40 | 20 | 10 | 7 | 30 | 70 | 40 | 20 | 40 | 30 |

TABLE 3-continued

|  | Run No. | | | | | | | | | | |
|---|---|---|---|---|---|---|---|---|---|---|---|
|  | 1 | 2 | 3 | 4 | 5 | 6 | 7 | 8 | 9 | 10 | 11 |
| (μ) of Crystal | | | | | | | | | | | |

Note
M: micaceous form
F: fibrous form

EXAMPLE 7

Sodium hydroxide and slaked lime were added to 190 cc of water so that the molar amounts of $Na_2O$ and CaO shown in Table 4 were attained. A starting silica material shown in Table 4 was added to the resulting slurry. Then, the slurry was charged and sealed in an autoclave and reacted at 200° C. for 20 hours. The post treatments were carried out in the same manner as described in Example 1 to obtain a dry product. Obtained results are shown in Table 4. As the hydrous silica was used Tokusil Gu (manufactured and sold by Tokuyama Soda Co., Ltd.). The terra alba used was one produced at Beppu, Ohita-ken, Japan. The pulverized product capable of passing through a 325-mesh sieve was used.

When the chemical analysis values were corrected by the above-mentioned alumina correction, it was found that each product had a composition of $3Na_2O.9CaO.32SiO_2.25H_2O$.

TABLE 4

|  | Run No. 1 | Run No. 2 | Run No. 3 | Run No. 4 |
|---|---|---|---|---|
| Starting $SiO_2$ Material | hydrous silica | hydrous silica | terra abla | terra abla |
| Composition of Suspension | | | | |
| $SiO_2$ (mole) | 0.143 | 0.197 | 0.143 | 0.197 |
| $Na_2O$ (mole) | 0.040 | 0.072 | 0.040 | 0.072 |
| CaO (mole) | 0.025 | 0.025 | 0.025 | 0.025 |
| Starting Material Charge Coefficient T | 1.7 | 1.7 | 1.7 | 1.7 |
| Alkalinity Coefficient U | 0.003 | 0.006 | 0.003 | 0.006 |
| Amount (g) of Product | 8.9 | 8.8 | 8.8 | 8.9 |
| Form | fibrous | micaceous | fibrous | micaceous |
| Maximum Size (μ) of Crystal | 30 | 30 | 40 | 40 |

EXAMPLE 8

1.4 g of calcium oxide was pulverized so that all the particles could pass through a 100-mesh sieve, and the pulverized calcium oxide was thrown into 100 cc of water. The reaction was carried out in the same manner as described in Example 1 except that the so formed slurry was used instead of the slurry containing .025 mole/l of slaked lime, used in Example 1. The post treatments were comducted in the same manner as described in Example 1. By the chemical analysis and alumina correction, it was found that the product had a composition of $3Na_2O.9CaO.32SiO_2.25H_2O$. The amount of the product was 8.5 g. By the electron microscope observation, it was found that the product was composed of micaceous flake crystals having a size of 30μ.

EXAMPLE 9

1.4 g of calcium oxide was pulverized so that all the particles could pass through a 100-mesh sieve, and the pulverized calcium oxide was thrown into 100 cc of water. The reaction was carried out in the same manner as described in Example 2 except that the so formed slurry was used instead of the slurry containing 0.25 mole/l of slaked lime, used in Example 2. The post treatments were conducted in the same manner as described in Example 2. By the chemical analysis and alumina correction, it was found that the product had a composition of $3Na_2O.9CaO.32SiO_2.25H_2O$. The amount of the product was 8.6 g. By the electron microscope observation, it was found that the product was composed of fibrous crystals having a length of about 30μ.

EXAMPLE 10

Under atmospheric pressure, 100 cc of an aqueous solution containing 1.0 mole/l of sodium silicate ($SiO_2/Na_2O$ molar ratio=2.0) was mixed with 100 cc of an aqueous solution containing 0.25 mole/l of calcium chloride at a temperature of 25° C. In this case, the starting material charge coefficient T calculated according to the formula (A) was 1.67 and the alkalinity coefficient U calculated according to the formula (C) was 0.063. On mixing, white precipitates were formed. The resulting slurry was charged and sealed in an autoclave, reacted at 200° C. for 20 hours and treated in the same manner as described in Example 1 to obtain 8.7 g of a dry product.

By the electron microscope observation, it was found that the product was composed of micaceous flakes having one side length of 50μ. By the chemical analysis and alumina correction, the product was found to have a composition of $3Na_2O.9CaO.32SiO_2.25H_2O$.

EXAMPLE 11

Under atmospheric pressure, 100 cc of an aqueous solution containing 0.65 mole/l of sodium silicate ($SiO_2/Na_2O$ molar ratio=2.14) was mixed with 100 cc of an aqueous solution containing 0.25 mole/l of calcium chloride at a temperature of 25° C. In this case, the starting material charge coefficient T calculated according to the formula (A) was 1.6 and the alkalinity coefficient U calculated according to the formula (C) was 0.003. On mixing, the mixture was converted to a white slurry. The resulting slurry was charged and sealed in an autoclave, reacted at 200° C. for 20 hours and treated in the same manner as described in Example 1 to obtain 8.7 g of a dry product.

By the chemical analysis and alumina correction, the product was found to have a composition of $3Na_2O.9CaO.32SiO_2.25H_2O$. By the electron microscope observation, it was confirmed that the product was composed of fibrous crystals having a size of about 30μ.

EXAMPLE 12

The reaction was carried out in the same manner as described in Example 10 except that the starting material ratio and the molar quantity of sodium silicate were changed as indicated in Table 5. Obtained results are shown in Table 5. In all the products other than the product of Run No. 4, the chemical composition after the alumina correction was substantially $3Na_2O \cdot 9CaO \cdot 32SiO_2 \cdot 25H_2O$. By the chemical analysis, the product of Run No. 4 was found to have a composition of $(3Na_2O \cdot 9CaO \cdot 32SiO_2 \cdot 25H_2O)(1.4SiO_2 \cdot 0.5H_2O)$.

TABLE 5

| | Run No. | | | | | | | |
|---|---|---|---|---|---|---|---|---|
| | 1 | 2 | 3 | 4 | 5 | 6 | 7 | 8 |
| Composition of Suspension | | | | | | | | |
| SiO$_2$ (mole) | 0.172 | 0.223 | 0.248 | 0.274 | 0.134 | 0.151 | 0.266 | 0.285 |
| Na$_2$O (mole) | 0.097 | 0.097 | 0.097 | 0.097 | 0.060 | 0.070 | 0.130 | 0.130 |
| CaO (mole) | 0.025 | 0.025 | 0.025 | 0.025 | 0.025 | 0.025 | 0.05 | 0.05 |
| H$_2$O (mole) | 10.6 | 10.6 | 10.6 | 10.6 | 10.6 | 10.6 | 10.6 | 10.6 |
| Starting Material Coefficient T | 1.3 | 2.1 | 2.5 | 2.9 | 1.7 | 1.7 | 1.4 | 1.7 |
| Alkalinity Coefficient U | 0.006 | 0.006 | 0.006 | 0.006 | 0.0025 | 0.0035 | 0.006 | 0.006 |
| Amount (g) of Product | 8.8 | 8.7 | 8.8 | 9.1 | 8.8 | 8.8 | 17.5 | 17.8 |
| Form | M | M | M | M | F | F | M | M |
| Maximum Length (μ) of Crystal | 10 | 15 | 10 | 7 | 20 | 30 | 20 | 30 |

Note
M: micaceous form
F: fibrous form

EXAMPLE 13

The reaction was carried out in the same manner as described in Example 10 except that an aqueous solution of calcium nitrate and an aqueous suspension of calcium sulfate were separately used instead of the aqueous solution of calcium chloride used in Example 10. The amounts of products obtained were 8.7 g and 8.8 g, respectively. By the chemical analysis and alumina correction, it was found that each product had a composition of $3Na_2O \cdot 9CaO \cdot 32SiO_2 \cdot 25H_2O$. By the electron microscope observation, it was confirmed that the products were composed of fibrous crystals having lengths of about 30μ and about 50μ, respectively.

EXAMPLE 14

The reaction was carrried out in the same manner as described in Example 11 except that an aqueous solution of calcium nitrate and an aqueous suspension of calcium sulfate were separately used instead of the aqueous solution of calcium chloride used in Example 11. The amounts of products obtained were 8.8 g and 8.9 g, respectively. By the chemical analysis and alumina correction, it was found that each product had a composition of $3Na_2O \cdot 9CaO \cdot 32SiO_2 \cdot 25H_2O$. By the electron microscope observation, it was confirmed that the products were composed of micaceous flake crystals having one side lengths of about 20μ and about 30μ, respectively.

EXAMPLE 15

Sodium calcium silicate was prepared in the same manner as described in Example 1, and when the filtrate left after recovery of the reaction product was analyzed, it was found that the filtrate was an aqueous solution containing 0.46 mole/l of sodium silicate (SiO$_2$/Na$_2$O molar ratio = 1.73). To 129 cc of this filtrate was added 41 cc of an aqueous solution containing 1.00 mole/l of sodium silicate (SiO$_2$/Na$_2$O molar ratio = 3.6) to form a homogeneous solution. Then, 30 cc of an aqueous slurry containing 0.83 mole/l of slaked lime was incorporated in and mixed with the above solution. In this case, the starting material charge coefficient T was 1.76 and the alkalinity coefficient U was 0.0086. Then, the liquid mixture was charged in an autoclave, and reacted and treated in the same manner as described in Example 1 to obtain 8.8 g of micaceous flake crystals having one side length of 40μ. By the chemical analysis and alumina correction, it was found that the product had a composition of $3Na_2O \cdot 9CaO \cdot 32SiO_2 \cdot 25H_2O$.

EXAMPLE 16

Sodium calcium silicate was prepared in the same manner as described in Example 2, and when the filtrate left after recovery of the reaction product was analyzed, it was found that the filtrate was an aqueous solution containing 0.16 mole/l of sodium silicate (SiO$_2$/Na$_2$O molar ratio = 1.58). To 129 cc of this filtrate were added 20.8 cc of an aqueous solution containing 1.00 mole/l of sodium silicate (SiO$_2$/Na$_2$O molar ratio = 3.5), 2.54 g of hydrous silica (Tokusil Gu, SiO$_2$ content = 85%) and 60 cc of an aqueous slurry containing 0.42 mole/l of slaked lime. In this case, the starting material charge coefficient T calculated by the formula (B) was 1.6 and the alkalinity coefficient U calculated by the formula (D) was 0.003. Then, the liquid mixture was charged in an autoclave, and reacted and treated in the same manner as described in Example 1 to obtain 8.8 g of fibrous crystals having a length of 40μ under an electron microscope. By the chemical analysis and alumina correction, it was found that the product had a composition of $3Na_2O \cdot 9CaO \cdot 32SiO_2 \cdot 25H_2O$.

EXAMPLE 17

Sodium calcium silicate was prepared in the same manner as described in Example 1, and when the filtrate left after recovery of the reaction product was analyzed, it was found that the filtrate was an aqueous solution containing 0.46 mole/l of sodium silicate (SiO$_2$/Na$_2$O molar ratio = 1.73). To 129 cc of this filtrate were added 41 cc of an aqueous solution containing 1.00 mole/l of sodium silicate (SiO$_2$/Na$_2$O molar ratio = 3.00) and 1.74 g of hydrous silica (Tokusil Gu, SiO$_2$ content = 85%) to adjust the SiO$_2$/Na$_2$O molar ratio to 2.5. Then, 30 cc of an aqueous slurry containing 0.83 mole/l of slaked lime was incorporated in and mixed with the above solution. In this case, the starting material charge coefficient T calculated by the formula (B) was 1.76 and the alkalinity coefficient U calculated by the formula (D) was 0.0086. Then, the liquid mixture was charged in an autoclave, and reacted and treated in the same manner as described in Example 1 to obtain 8.6 g of micaceous flake crystals having one side length of 40$\mu$ under an electron microscope. By the chemical analysis and alumina correction, it was found that the product had a composition of $3Na_2O.9CaO.32SiO_2.25H_2O$.

EXAMPLE 18

The reaction and treatment were carried out in the same manner as described in Example 16 except that natural soluble silica (produced at Beppu, Ohita-ken, Japan; capable of passing through a 325-mesh sieve) was used instead of the hydrous silica used in Example 16, to obtain 8.8 g of sodium calcium silicate composed of fibrous crystals having a length of about 30$\mu$. By the chemical analysis and alumina correction, it was found that the product had a composition of $3Na_2O.9CaO.32SiO_2.25H_2O$.

EXAMPLE 19

The reaction and treatment were carried out in the same manner as in Example 17 except that terra alba (produced at Beppu, Ohita-ken, Japan; capable of passing through a 325-mesh sieve) was used instead of the hydrous silica used in Example 17, to obtain 8.8 g of sodium calcium silicate composed of micaceous flake crystals having one side length of 40$\mu$. By the chemical analysis and alumina correction, it was found that the product had a composition of $3Na_2O.9CaO.32SiO_2.25H_2O$.

EXAMPLE 20

1 g of a sample was collected from the sodium calcium silicate prepared in Example 1 and the sample was thrown into a 10% aqueous solution of potassium chloride maintained at 20° C. The mixture was maintained at this temperature under agitation for 10 hours. The slurry was filtered and the sodium content in the filtrate was determined by chemical analysis. It was found that sodium was contained in the filtrate in an amount of 0.06 g as $Na_2O$. The cake recovered by filtration was thrown in a 10% aqueous solution of sodium chloride and treated in the same manner as described above. By the analysis of the filtrate, it was found that potassium was contained in an amount of 0.09 g as $K_2O$. Furthermore, the recovered cake was thrown into a 10% aqueous solution of potassium chloride and treated in the same manner as described above. By the analysis of the filtrate, it was found that sodium was contained in an amount of 0.055 g as $Na_2O$. From these results, it was confirmed that the ion exchange had been conducted. Supposing that all the $Na_2O$ portion of sodium calcium silicate having a composition of $3Na_2O.9CaO.32SiO_2.25H_2O$ is ion-exchangeable, the ion exchange capacity is 1.96 milliequivalents per gram. The measured values were 1.94 milliequivalent per gram at the first measurement, 1.91 milliequivalents per gram at the second measurement and 1.77 milliequivalents per gram at the third measurement. Namely, the measured values were very close to the theoretical value.

EXAMPLE 21

1 g of a sample was collected from the sodium calcium silicate obtained in Example 2 and the ion exchange capacity was measured in the same manner as described in Example 20. The measured values were 1.92 milliequivalents per gram at the first measurement, 1.87 milliequivalents per gram at the second measurement and 1.80 milliequivalents per gram at the third measurement. Namely, the measured values were very close to the theoretical value.

EXAMPLE 22

1 g of a sample was collected from the sodium calcium silicate obtained in Example 3 and the ion exchange capacity was measured in the same manner as described in Example 20. The measured values were 1.49 milliequivalents per gram at the first measurement, 1.40 milliequivalents per gram at the second measurement and 1.41 milliequivalents per gram at the third measurement. Namely, the measured values were close to the theoretical value.

EXAMPLE 23

Runs Nos. 1 and 2 of Example 7 were repeated under the same conditions except that quartz (capable of passing through a 325-mesh sieve) was used instead of the hydrous silica. When the reaction was carried out under the conditions of Run No. 1, 8.6 g of a fibrous crystal having a maximum crystal length of 40$\mu$ was obtained. When the reaction was carried out under the conditions of Run No. 2, 8.5 g of a micaceous crystal having a maximum crystal size of 30$\mu$ was obtained. By the chemical analysis and alumina correction, it was found that each product had a composition of $3Na_2O.9CaO.32SiO_2.25H_2O$.

EXAMPLE 24

A slurry was prepared by mixing 100 cc of an aqueous solution of sodium carbonate having a concentration of 2.0 moles/l as $Na_2O$ with 100 cc of an aqueous slurry of slaked lime having a concentration of 0.25 mole/l as CaO. Then, 6.4 g of hydrous silica (Tokusil Gu manufactured by Tokuyama Soda Co., Ltd.; $SiO_2$ content=85%) was added to the slurry and the mixture was strongly agitated. In this case, the charged $SiO_2$/CaO molar ratio was 3.6, and the alkalinity coefficient U' calculated by the above formula (M) was 0.0083. The resulting slurry was charged and sealed in an autoclave, and reaction was carried out at 200° C. for 30 hours. After completion of the reaction, the reaction mixture was taken out from the autoclave and filtered and the recovered reaction product was washed 3 times with 100 cc of deionized water and dried at 100° C. for 8 hours.

The amount of the obtained dry product was 8.6 g. When the product was analyzed according to the method of JIS R-3101, it was found that the product was composed of 6.1% of $Na_2O$, 15.6% of CaO, 62.5% of $SiO_2$, 0.7% of $Al_2O_3$ and 15.1% of $H_2O$. When the alumina correction was made according to the method described hereinbefore, it was found that the product was represented by the composition formula $3Na_2O.9CaO.32SiO_2.26H_2O$. When 1 g of this product was treated with a 0.5 N NaOH aqueous solution at 80° C. for 1 hour, any substance was hardly dissolved out. Accordingly, it was confirmed that the product was substantially free of impurities such as amorphous silica. When the product was photographed at 1000 magnifications by using an electron microscope (Model JSM-50A manufactured and sold by Nippon Denshi Kabushiki Kaisha), a photo similar to that shown in FIG. 1' was obtained. Thus, it was confirmed that the product was composed of substantially square micaceous flakes having one side length of about 30μ and a thickness smaller than 0.1μ. Powder of this product was subjected to X-ray diffractiometry with CuKα at 2θ of 5°–50° by using an X-ray diffractometer (Model Rotaflex PL 200 manufactured and sold by Rigaku Denki Kabushiki Kaisha). The obtained X-ray diffraction pattern diagram was similar to that shown in FIG. 2.

When the filtrate left after recovery of the reaction product was analyzed, the presence of sodium silicate was confirmed but the calcium component was hardly detected.

EXAMPLE 25

Under atmospheric pressure, 100 cc of an aqueous solution containing 2.0 moles/l of sodium silicate as $Na_2O$ ($SiO_2/Na_2O$ molar ratio=2.5) was mixed with 100 cc of an aqueous slurry containing 0.2 mole/l of slaked lime at a temperature of 25° C. In this case, the starting material charge coefficient T calculated by the above formula (B) was 1.80 and the alkalinity coefficient U calculated by the above formula (D) was 0.0183. The resulting slurry was charged and sealed in an autoclave having an inner capacity of 300 ml, and reaction was carried out at 180° C. for 20 hours under agitation with an electromagnetic stirring vane. After completion of the reaction, the reaction mixture was taken out from the autoclave and filtered and the recovered reaction product was washed 3 times with 100 cc of deionized water and dried at 100° C. for 8 hours.

Figure 5:
FIG. 5 is an electron microscope photograph of one instance of sodium calcium silicate of the type 13 Å having a micaceous form.
Figure 6:
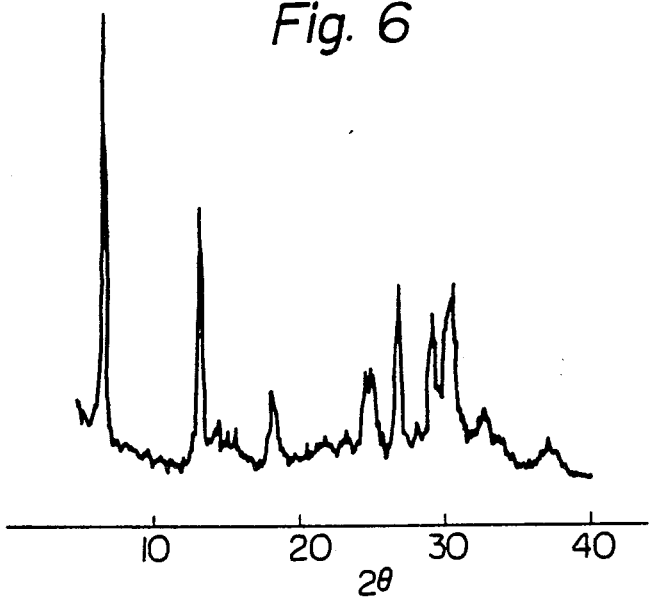
FIG. 6 is a diagram illustrating the X-ray diffraction pattern of the sodium calcium silicate shown in FIG. 5.

The amount of the obtained dry product was 7.6 g. When the product was analyzed according to the method of JIS R-3101, it was found that the product was composed of 11.0% of $Na_2O$, 14.7% of CaO, 64.7% of $SiO_2$ and 9.5% of $H_2O$. Accordingly, it was found that the product was represented by the composition formula $5.42Na_2O.8CaO.32SiO_2.6.56H_2O$. When 1 g of this product was treated with a 0.5 N NaOH aqueous solution at 80° C. for 1 hour, any substance was hardly dissolved out. Accordingly, it was confirmed that the product was substantially free of impurities such as amorphous silica. When the product was photographed at 1000 magnifications by using an electron microscope (Model JSM-50A manufactured and sold by Nippon Denshi Kabushiki Kaisha), a photo shown in FIG. 5 was obtained. As is seen from FIG. 5, the product was composed of substantially square micaceous flakes having one side length of about 25μ and a thickness smaller than 0.1μ. Powder of this product was subjected to X-ray diffractiometry with CuKα at 2θ of 5°–50° by using an X-ray diffractometer (Model Rotaflex PL 200 manufactured and sold by Rigaku Denki Kabushiki Kaisha). The obtained X-ray diffraction pattern diagram is shown in FIG. 6. From FIG. 6, it will be understood that the product had a novel crystal structure heretofore not reported, characterized by strong peaks at spacings (d) of 13.4 Å, 6.7 Å, 3.5 Å, 3.3 Å, 3.1 Å, 3.0 Å and 2.9 Å.

When the filtrate left after recovery of the reaction product was analyzed, the presence of sodium silicate was confirmed but the calcium component was hardly detected.

EXAMPLE 26

A dry product was obtained by conducting the reaction and treatment in the same manner as described in Example 25 except that 100 cc of an aqueous solution of potassium silicate ($SiO_2/K_2O$ molar ratio=2.1) was used instead of 100 cc of the aqueous solution of sodium silicate ($SiO_2/Na_2O$ molar ratio=2.1) used in Example 25.

The amount of the obtained dry product was 8.4 g. When the product was analyzed according to the method of JIS R-3101, it was found that the product was composed of 15.4% of $K_2O$, 13.3% of CaO, 57.1% of $SiO_2$ and 14.2% of $H_2O$. Accordingly, it was found that the product was represented by the composition formula $5.52K_2O.8CaO.32SiO_2.26.48H_2O$. When 1 g of this product was treated with a 0.5 N NaOH aqueous solution at 80° C. for 1 hour, any substance was hardly dissolved out. Accordingly, it was confirmed that the product was substantially free of impurities such as amorphous silica. When the product was photographed at 1000 magnifications by using an electron microscope, a photo shown in FIG. 7 was obtained. As is seen from FIG. 7, the product was composed of substantially fibrous crystals having a length of about 100μ and a width of 1μ. Powder of this product was subjected to X-ray diffractiometry. The obtained X-ray diffraction pattern is shown in FIG. 8, from which it is seen that the product had strong peaks at spacings (d) of 13.4 Å, 6.7 Å, 3.5 Å, 3.3 Å, 3.0 Å and 2.9 Å.

EXAMPLE 27

The sodium calcium silicate in the micaceous form obtained in Example 25 was dipped in a 10% aqueous solution of potassium chloride for 1 hour, and the silicate was recovered by filtration and dried. By the chemical analysis, it was confirmed that in this dry product, sodium was substantially completely ion-exchanged with potassium. Thus, it was confirmed that the sodium calcium silicate hydrate obtained in Example 25 had an ion-exchanging property, and the ion exchange capacity was 3.5 milliequivalents per gram. Furthermore, it was confirmed that potassium calcium silicate in the micaceous form was obtained by this ion exchange treatment.

EXAMPLE 28

The fibrous sodium calcium silicate obtained in Example 26 was dipped in a 10% aqueous solution of potassium chloride for 1 hour, and the silicate was recovered by filtration and dried. By the chemical analysis and electron microscope observation, it was confirmed that in this dry product, sodium was substantially completely ion-exchanged with potassium and potassium calcium silicate in the micaceous form was obtained by this ion exchange treatment. The ion exchange capacity was 3.3 milliequivalent per gram.

EXAMPLE 29

Under atmospheric pressure, 100 cc of an aqueous solution containing 1.75 moles/l as $Na_2O$ of sodium silicate ($SiO_2/Na_2O$ molar ratio=2.03) was mixed with 100 cc of an aqueous slurry containing 0.25 mole/l of slaked lime at a temperature of 25° C. In this case, the starting material charge coefficient T calculated by the above formula (B) was 1.6 and the alkalinity coefficient U calculated by the above formula (D) was 0.015. The resulting slurry was charged and sealed in an autoclave having an inner capacity of 300 ml, and reaction was carried out at 175° C. for 20 hours under agitation with an electromagnetic stirring vane. After completion of the reaction, the reaction mixture was taken out from the autoclave and filtered and the recovered reaction product was washed 3 times with 100 cc of deionized water and dried at 100° C. for 8 hours.

The amount of the obtained dry product was 9.5 g. When the product was analyzed according to the method of JIS R-3101, it was found that the product was composed of 11.1% of $Na_2O$, 14.6% of CaO, 64.7% of $SiO_2$ and 9.5% of $H_2O$. Accordingly, it was found that the product was represented by the composition formula $5.52Na_2O.8CaO.33SiO_2.16.28H_2O$. When 1 g of this product was treated with a 0.5 N NaOH aqueous solution at 80° C. for 1 hour, any substance was hardly dissolved out. Accordingly, it was confirmed that the product was substantially free of impurities such as amorphous silica. When the product was photographed at 1000 magnifications by using an electron microscope, a photo similar to that shown in FIG. 5 was obtained. The product was composed of substantially square micaceous flakes having one side length of about $20\mu$ and a thickness smaller than $0.1\mu$. Powder of this product was subjected to X-ray diffractiometry at $2\theta$ of 5°–50° by using an X-ray diffractometer. The obtained X-ray diffraction pattern diagram was similar to that shown in FIG. 6. The product showed strong peaks at spacings (d) of 13.4 Å, 6.7 Å, 3.5 Å, 3.3 Å, 3.1 Å, 3.0 Å and 2.9 Å.

When the filtrate left after recovery of the reaction product was analyzed, the presence of sodium silicate was confirmed but the calcium component was hardly detected.

EXAMPLE 30

Under atmospheric pressure, 100 cc of an aqueous solution containing 1.75 moles/l as $Na_2O$ of sodium silicate ($SiO_2/Na_2O$ molar ratio=2.31) was mixed with 100 cc of an aqueous slurry containing 0.25 mole/l of slaked lime at a temperature of 25° C. In this case, the starting material charge coefficient T calculated according to the formula (B) was 1.8 and the alkalinity coefficient U calculated according to the formula (D) was 0.015. The resulting slurry was reacted at 225° C. for 20 hours and treated in the same manner as described in Example 25 to obtain 8.7 g of a dry product.

When the product was subjected to chemical analysis, it was found that the product was composed of 6.1% of $Na_2O$, 16.1% of CaO, 63.1% of $SiO_2$ and 14.6% of $H_2O$. Accordingly, the product was found to have a composition of $2.72Na_2O.8CaO.30OSiO_2.22.48H_2O$. When the product was treated with a 0.5 N NaOH aqueous solution at 80° C. for 1 hour, any substance was not substantially dissolved out. Thus, it was confirmed that the product was free of impurities such as amorphous silicate. A photograph of the product taken at 1000 magnifications by using an electron microscope was similar to that shown in FIG. 1. It was found that the product was composed of micaceous flake crystals having one side length of about $30\mu$ and a thickness less than $0.1\mu$. An X-ray diffraction pattern of the powder of the product was similar to that shown in FIG. 2. Accordingly, it was confirmed that the product had a novel crystal structure having strong peaks at spacings (d) of 12.0 Å, 6.0 Å, 3.4 Å and 3.0 Å.

EXAMPLE 31

Under atmospheric pressure, 100 cc of an aqueous solution containing 1.53 moles/l of sodium silicate ($SiO_2/Na_2O$ molar ratio=3.14) was mixed with 100 cc of an aqueous slurry containing 0.25 mole/l of slaked lime at a temperature of 25° C. In this case, the starting material charge coefficient T calculated by the above formula (B) was 2.7 and the alkalinity coefficient U calculated by the above formula (D) was 0.013. The resulting slurry was charged and sealed in an autoclave, and reacted at 175° C. for 20 hours and treated in the same manner as described in Example 25 to obtain a dry product.

When the product was subjected to chemical analysis, it was found that the product was composed of 4.7% of $Na_2O$, 12.6% of CaO, 70.6% of $SiO_2$ and 12.0% of $H_2O$.

The product was treated with a 0.5 N NaOH aqueous solution at 80° C. for 1 hour, washed with water and dried. When the alkali-treated product was subjected to chemical analysis, it was found that the product was composed of 5.8% of $Na_2O$, 15.4% of CaO, 64.3% of $SiO_2$ and 14.5% of $H_2O$.

Accordingly, the product was found to have a composition of $2.72Na_2O.8CaO.31.2SiO_2.23.28H_2O$ after the alkali treatment and a composition of $(2.72Na_2O.8CaO.31.2SiO_2.23.28H_2O)(10.6SiO_2.0.4H_2O)$ before the alkali treatment. Both the X-ray diffraction patterns of the product before the alkali treatment and the alkali-treated product were substantially the same as that shown in FIG. 2. By the electron microscope observation, it was found that no substantial change was caused in the crystal structure and the product was composed of micaceous flakes having one side length of about $2\mu$.

EXAMPLE 32

Under atmospheric pressure, 100 cc of an aqueous solution containing 0.932 mole/l as $K_2O$ of potassium silicate ($SiO_2/K_2O$ molar ratio=3.6) was mixed with 100 cc of an aqueous slurry containing 0.666 mole/l of slaked lime at a temperature of 25° C. In this case, the starting material charge coefficient T calculated by the above formula (B) was 1.8 and the alkalinity coefficient U calculated by the above formula (D) was 0.007. The $K_2O$/CaO molar ratio was 1.4. The resulting slurry was charged and sealed in an autoclave having an inner capacity of 300 ml, and reaction was carried out at 200° C. for 20 hours under agitation with an electromagnetic stirring vane. After completion of the reaction, the reaction mixture was taken out from the autoclave and filtered and the recovered reaction product was washed 3 times with 100 cc of deionized water and dried at 100° C. for 8 hours.

The amount of the obtained dry product was 22.2 g. When the product was analyzed according to the method of JIS R-3101, it was found that the product was composed of 9.20% of $K_2O$, 16.44% of CaO, 62.62% of $SiO_2$ and 11.74% of $H_2O$.

Results of the X-ray diffractiometry of the product were substantially the same as those shown in FIG. 4. It was confirmed that the product had strong peaks at spacings (d) of 12.0 Å, 6.0 Å, 3.15 Å, 3.00 Å and 2.95 Å, and that the product was of 12 Å type.

Figure 2:
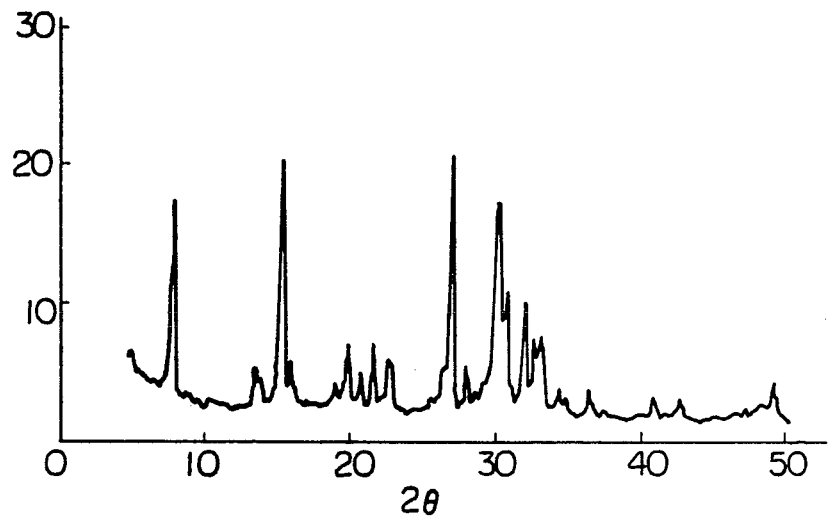
FIG. 2 is a diagram illustrating the X-ray diffraction pattern of the sodium calcium silicate shown in FIG. 1.

When the product was photographed at 1000 magnifications by using an electron microscope, a photo similar to that shown in FIG. 1 was obtained. It was confirmed that the product was composed of fibrous crystals having a length of about $33\mu$.

EXAMPLE 33

Under atmospheric pressure, 100 cc of an aqueous solution containing 1.176 moles/l as $K_2O$ of potassium silicate ($SiO_2/K_2O$ molar ratio=2.17) was mixed with 100 cc of an aqueous slurry containing 0.147 mole/l of slaked lime at a temperature of 25° C. In this case, the starting material charge coefficient T calculated by the above formula (B) was 1.8 and the alkalinity coefficient U calculated by the above formula (D) was 0.010. The K$_2$O/CaO molar ratio was 8. The resulting slurry was charged and sealed in an autoclave and reaction was carried out at 200° C. for 20 hours under agitation with an electromagnetic stirring vane.

After completion of the reaction, the reaction mixture was taken out from the autoclave and filtered and the recovered reaction product was washed 3 times with 100 cc of deionized water and dried at 100° C. for 8 hours.

The amount of the obtained dry product was 4.9 g. When the product was analyzed according to the method of JIS R-3101, it was found that the product was composed of 15.93% of K$_2$O, 13.80% of CaO, 59.17% of SiO$_2$ and 11.09% of H$_2$O.

Results of the X-ray diffractiometry of the product were substantially the same as those shown in FIG. 8. It was confirmed that the product had strong peaks at spacings (d) of 13.4 Å, 6.7 Å, 3.5 Å, 3.3 Å and 2.9 Å and that the product was of the high potassium type.

Figure 7:
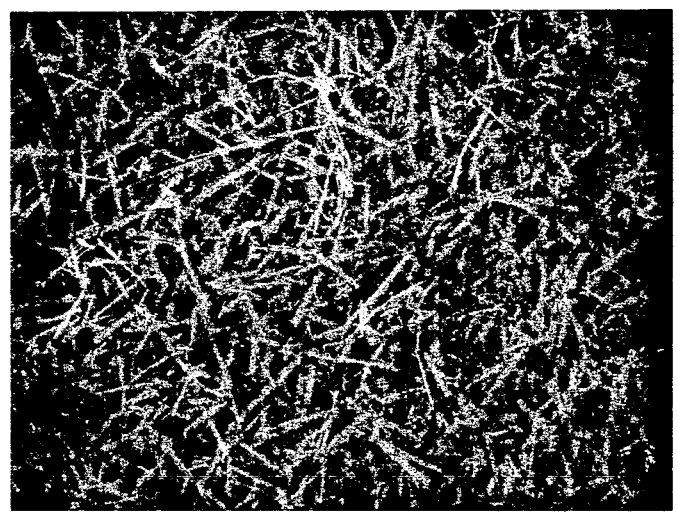
FIG. 7 is an electron microscope photograph of one instance of potassium calcium silicate of the type 13 Å having a fibrous form.
Figure 8:
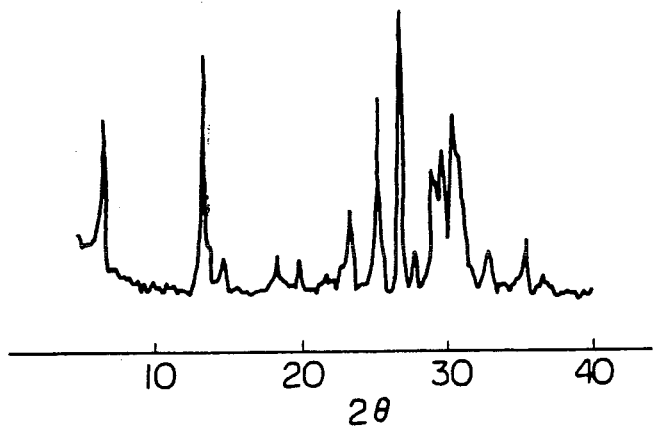
FIG. 8 is a diagram illustrating the X-ray diffraction pattern of the potassium calcium silicate shown in FIG. 7.

An electron microscope photograph of the product was similar to that shown in FIG. 7, and it was confirmed that the product was composed of fibrous crystals having a length of about 50μ.

EXAMPLE 34

The reaction was carried out in the same manner as described in Example 33 except that the hydrothermal reaction time were changed as indicated in Table 6. Obtained results are shown in Table 6.

TABLE 6

|  | Run No. 1 | Run No. 2 | Run No. 3 | Run No. 4 |
| --- | --- | --- | --- | --- |
| Reaction Temperature (°C.) | 150 | 180 | 220 | 240 |
| Reacton Time (hours) | 20 | 20 | 20 | 20 |
| Yield (g) | 4.9 | 4.9 | 5.1 | 5.1 |
| Fiber Length (μ) | 45 | 50 | 85 | 90 |
| X-Ray Diffractiometry Results | 13 Å | 13 Å | 12 Å | 12 Å |

EXAMPLE 35

A slurry was prepared by mixing 100 cc of an aqueous solution of potassium carbonate having a concentration of 2.0 moles/l as K$_2$O with 100 cc of an aqueous slurry of slaked lime having a concentration of 0.25 mole/l as CaO. Then, 6.4 g of hydrous silica (Tokusil Gu manufactured by Tokuyama Soda Co., Ltd.; SiO$_2$ content=85%) was added to the slurry and the mixture was strongly agitated. The charged SiO$_2$/CaO and K$_2$O/CaO molar ratios were 3.6 and 8.0, respectively.

The alkalinity coefficient (U) calculated by the formula (M) was 0.0086. The resulting slurry was charged and sealed in an autoclave, and reaction was carried out at 200° C. for 30 hours. After completion of the reaction, the reaction mixture was taken out from the autoclave and filtered and the recovered reaction product was washed 3 times with 100 cc of deionized water and dried at 100° C. for 8 hours.

The amount of the obtained product was 8.6 g. By the chemical analysis, the product was found to have a composition of 3K$_2$O.9CaO.32SiO$_2$.20H$_2$O. The results of the X-ray diffractiometry were similar to those shown in FIG. 4. By the electron microscope observation according to JIS R-3101, it was confirmed that the product was composed of fibrous crystals having a length of about 200μ and an aspect ratio of 120.

EXAMPLE 36

An aqueous solution of potassium carbonate was mixed with starting silica and calcium materials shown in Table 7 so that the total charged volume was 200 cc. The mixture was strongly agitated and charged and sealed in an autoclave. Reaction was carried out at 200° C. for 30 hours. The alkalinity coefficient (U) calculated by the formula (N) was 0.0026. Obtained results are shown in Table 7. In each run, potassium calcium silicate in the fibrous form was synthesized in a high yield. The results of the X-ray diffractiometry of each product were similar to those shown in FIG. 4.

The composition of the slurry to be subjected to the hydrothermal reaction is as follows:

K$_2$O: 0.125 mole/l
SiO$_2$: 0.090 mole/l
CaO: 0.025 mole/l
K$_2$O/CaO molar ratio: 5.0
SiO$_2$/CaO molar ratio: 3.6

TABLE 7

|  | Run No. 1 | Run No. 2 | Run No. 3 | Run No. 4 |
| --- | --- | --- | --- | --- |
| SiO$_2$ Material | hydrous silica | hydrous silica | terra abla | quartz |
| Ca Material | calcium nitrate | calcium sulfate | calcium chloride | calcium chloride |
| Yield (g) | 8.6 | 8.5 | 8.8 | 8.8 |
| Fiber Length (μ) | 150 | 200 | 180 | 150 |

The hydrous silica used was the same Tokusil Gu as described above. The terra abla used was one produced at Beppu, Ohita-ken, Japan and having an SiO$_2$ content of 90%. The quartz used was one having an SiO$_2$ content of 99.1%. Each of the terra abla and quartz was used after it had been pulverized so that the particles were capable of passing through a 325-mesh sieve.

EXAMPLE 37

Under atmospheric pressure, 100 cc of an aqueous solution containing 1.0 mole/l of potassium silicate (SiO$_2$/K$_2$O molar ratio=2.5) was mixed with 100 cc of an aqueous slurry containing 0.25 mole/l of slaked lime at a temperature of 25° C. In this case, the starting material charge coefficient T calculated by the above formula (B) was 1.76. The alkalinity coefficient (U) calculated by the formula (D) was 0.0086, and the K$_2$O/CaO molar ratio was 4.0. On mixing, white precipitates were formed. The resulting slurry was charged and sealed in an autoclave, and reaction was carried out at 200° C. for 26 hours under agitation with an electromagnetic stirring vane. After completion of the reaction, the reaction mixture was taken out from the autoclave and filtered and the recovered reaction product was washed 3 times with 100 cc of deionized water and dried at 100° C. for 8 hours.

The amount of the obtained dry product was 8.5 g. By the X-ray diffractiometry, the product was found to be crystalline. When the product was composed of 9.2% of K$_2$O, 16.4% of CaO, 62.6% of SiO$_2$ and 11.7% of H$_2$O. Accordingly, it was found that the product was represented by the composition formula 3K$_2$O.9CaO.3-2SiO$_2$.20H$_2$O. When 1 g of this product was treated with a 0.5 N NaOH aqueous solution at 80° C. for 1 hour, any substance was hardly dissolved out. Accordingly, it was confirmed that the product was substantially free of impurities such as amorphous silica. When the product was photographed by using an electron microscope, a photo similar to that shown in FIG. 3 was obtained. It was confirmed that the product was composed of fibrous crystals having a length of about 200μ and a width of 2μ.

The X-ray diffraction pattern of the product was similar to that shown in FIG. 4. When the product was subjected to the thermal analysis, there were observed a broad endothermic peak at about 150° C., a sharp endothermic peak at about 250° C. and an endothermic peak at about 820° C. It was found that dehydration was caused in two stages and water of crystallization was isolated at 150° C. and 210° C. When the filtrate left after collection of the reaction product by filtration was analyzed, the presence of potassium silicate was confirmed but the calcium component was hardly detected.

EXAMPLE 38

A slurry was prepared by mixing 100 cc of an aqueous solution of potassium hydroxide having a concentration of 1.0 mole/l as $K_2O$ with 100 cc of an aqueous slurry of slaked lime having a concentration of 0.25 mole/l as CaO. Then, 17.65 g of hydrous silica (Tokusil Gu manufactured by Tokuyama Soda Co., Ltd.; $SiO_2$ content=85%) was added to the slurry and the mixture was strongly agitated.

In this case, the starting material charge coefficient T calculated according to the formula (B) was 1.76. The alkalinity coefficient (U) calculated by the formula (D) was 0.0086.

The resulting slurry was charged and sealed in an autoclave, and reaction was carried out at 200° C. for 20 hours. After completion of the reaction, the reaction mixture was taken out from the autoclave and filtered and the recovered reaction product was washed 3 times with 100 cc of deionized water and dried at 100° C. for 8 hours.

The amount of the obtained product was 8.6 g. By the chemical analysis, the product was found to have a composition of $3K_2O.8CaO.32SiO_2.20H_2O$. The results of the X-ray diffractometry were similar to those shown in FIG. 4. By the electron microscope observation, it was confirmed that the product was composed of fibrous crystals having a length of about 200μ and as aspect ratio of 120.

In the filtrate left after collection of the product by filtration, the calcium component was hardly detected.

What we claim is:

1. An alkali calcium silicate having an X-ray diffraction pattern having diffraction peaks at spacings (d) of 11.8–12.2 Å, 6 Å and 3 Å.

2. An alkali calcium silicate as set forth in claim 1, which has substantially the same X-ray diffraction pattern as that shown in FIG. 2.

3. An alkali calcium silicate as set forth in claim 1, which has a composition represented by the following formula:

$$aNa_2O.bK_2O.cCaO.dSiO_2.eH_2O$$

wherein
a is zero or a number larger than 0, b is zero or a number larger than 0, c is a number of from 7 to 9, d is a number of from 30 to 34 and e is a number of from 0 to 30, with the proviso that the sum of a and b is larger than 0 but smaller than or equal to 8.

4. An alkali calcium silicate as set forth in claim 1, which has a composition represented by the following formula:

$$(2.5-3.5)R_2O.(7-9)CaO.32SiO_2.mH_2O$$

wherein
R stands for at least one alkali metal selected from the group consisting of sodium and potassium, and m is a number of from 0 to 30.

5. An alkali calcium silicate as set forth in claim 1, which is composed of a composite of a crystalline alkali calcium silicate and amorphous silica, said composite having a composition represented by the following formula:

$$(aNa_2O.bK_2O.cCaO.dSiO_2.eH_2O).(mSiO_2.nH_2O)$$

wherein
a is zero or a number larger than 0, b is zero or a number larger than 0, c is a number of from 7 to 9, d is a number of from 30 to 34 and e is a number of from 0 to 30, with the proviso that the proviso that the sum of a and b is larger than 0 but smaller than or equal to 8, and m is a number larger than 0 and n is a number larger than 0.

6. An alkali calcium silicate as set forth in any of claims 1, 2, 3, 4 or 5, which is composed of fibrous crystals.

7. An alkali calcium silicate as set forth in claim 8 wherein the fibrous crystals have a length of 20 to 300μ and an aspect ratio of 50 to 200.

8. An alkali calcium silicate as set forth in any of claims 1, 2, 3 or 4, which is composed of micaceous flake crystals.

9. An alkali calcium silicate as set forth in claim 10 wherein the micaceous flake crystals have a length of 5 to 100 and a thickness of 0.05 to 0.2μ.

10. A process for the preparation of alkali calcium silicates, which comprises subjecting an aqueous suspension of an alkali component, a calcium component and a silicon dioxide component to hydrothermal reaction under pressure at a temperature of 150° to 250° C., wherein the amounts of the alkali component, the calcium component and the silicon dioxide component inthe aqueous suspension are arranged so that when an alkali metal salt is formed as a by-product by the reaction, the starting material charge coefficient T represented by the following formula:

$$T=(9Y-32Z/9X-12Z) \tag{A}$$

wherein
X stands for the amount (moles) of the alkali component as $R_2O$ contained in the aqueous suspension, in which R is an alkali metal selected from the group consisting of sodium and potassium, Y stands for the amount (moles) of the silicon dioxide component as $SiO_2$ contained in the aqueous suspension and Z stands for the amount (moles) of the calcium component as CaO contained in the aqueous suspension in the range of from 1.2 to 3.0 and the alkalinity coefficient U represented by the following formula:

$$U=(3X-4Z/3S) \tag{C}$$

wherein

X and Z are as defined above and S stands for the amount (moles) of $H_2O$ contained in the aqueous suspension, is in the range of from 0.002 to 0.04, and when an alkali metal salt is not formed as a by-product by the reaction, the starting material charge coefficient T represented by the following formula:

$$T = (9Y - 32Z/9X - 3Z) \quad (B)$$

wherein

X, Y and Z are as defined above, is in the range of from 1.2 to 3.0 and the alkalinity coefficient U represented by the following formula:

$$U = (3X - Z/3S) \quad (D)$$

wherein X, Z and S are as defined above, is in the range of from 0.002 to 0.04.

11. A process for the preparation of alkali calcium silicates according to claim 12, wherein the silicon dioxide component is a soluble silicon dioxide component and the hydrothermal reaction is carried out under conditions satisfying any one of requirements defined by the following formula combinations (E), (F) and (G):

$$\left. \begin{array}{c} 1.2 \leq T \leq 0.00533t + 0.4 \\ U \leq 0.01 \end{array} \right\} (E)$$

$$\left. \begin{array}{c} 0.00533t + 0.4 < T \leq 0.008t + 0.8 \\ 0.002 \leq U \leq 0.0002t - 0.025 \end{array} \right\} (F)$$

$$\left. \begin{array}{c} 0.008t + 0.8\ T \leq 3.0 \\ 0.002 \leq U \leq 0.04 \end{array} \right\} (G)$$

wherein

T stands for said starting material charge coefficient, U stands for said alkalinity coefficient and t stands for the hydrothermal reaction temperature (° C.).

whereby an alkali calcium silicate of the type 12Å is formed.

12. A process for the preparation of alkali calcium silicates according to claim 10, wherein the silicon dioxide component is a hardly soluble silicon dioxide component and the hydrothermal reaction is carried out at a temperature of 150° to 250° C. under conditions satisfying any one of requirements defined by the following formula combinations (I), (J) and (K):

$$\left. \begin{array}{c} 1.2 \leq T \leq 0.006t + 0.15 \\ U \leq 0.01 \end{array} \right\} (I)$$

$$\left. \begin{array}{c} 0.006t + 0.15 < T \leq 0.008t + 0.6 \\ 0.002 \leq U \leq 0.00008t - 0.008 \end{array} \right\} (J)$$

$$\left. \begin{array}{c} 0.008t + 0.6 < T \leq 3.0 \\ 0.002 \leq U \leq 0.04 \end{array} \right\} (K)$$

wherein

T stands for said starting material charge coefficient, U stands for said alkalinity coefficient and t stands for the hydrothermal reaction temperature (° C.), whereby an alkali calcium silicate of the type 12 Å is formed.

13. A process for the preparation of alkali calcium silicates according to any of claims 10, 11 or 12 wherein the alkali component is selected from the group consisting of ROH, $RSiO_3$, RCl and $RNO_3$ wherein R is Na or K.

14. A process for the preparation of alkali calcium silicates according to any of claims 10, 11 or 12 wherein the alkalinity coefficient U is in the range of from 0.002 to 0.01.

15. A process for the preparation of alkali calcium silicates according to claim 10 wherein and the alkali component is a potassium component and potassium calcium silicate in the fibrous form is crystallized out by the hydrothermal reaction.

16. A process for the preparation of alkali calcium silicates according to claim 10 wherein the alkali component is a sodium component, the amounts of the components of the suspension are arranged so that (1) the starting material charge coefficient T is at least 2.5 or (2) the starting material charge coefficient T is less than 2.5 and the alkalinity coefficient U is at least 0.005, and the suspension is sujbected to the hydrothermal reaction, whereby sodium calcium silicate in the micaceous form is formed.

17. A process for the preparation of alkali carbon silicates according to claim 10 wherein the alkali component is a sodium component, the amounts of the compounds of the suspension are arranged so that the starting material charge coefficient T is less than 2.5 and the alkalinity coefficient U is less than 0.004, and the suspension is subjected to the hydrothermal reaction, whereby sodium calcium silicate in the fibrous form is formed.

18. A process for the preparation of alkali calcium silicates according to claim 10 wherein the alkali component is a sodium component the amounts of the components of the suspension are arranged so that the starting material charge coefficient T is less than 2.5 and the alkalinity coefficient U is in the range of from 0.004 to 0.005, and the suspension is subjected to the hydrothermal reaction, whereby sodium calcium silicate composed of a mixture of micaceous crystals and fibrous crystals is formed.

19. A process for the preparation of potassium calcium silicate in the micaceous form, which comprises causing the sodium calcium silicate in the micaceous form, obtained according to the process set forth in claim 20, to fall in contact with an aqueous solution containing a potassium component to ion-exchange the sodium component of the sodium calcium silicate with the potassium component.

20. A process for the preparation of sodium calcium silicate, which comprises adding a silicon dioxide component, sodium carbonate and a water-soluble calcium compound to an aqueous medium and subjecting the resulting aqueous suspension to hydrothermal reaction at a temperature of 150° to 250° C. under pressure, wherein the amounts of said three components are adjusted so that the molar ratio of the silicon dioxide component as $SiO_2$ in the suspension to the calcium compound as CaO in the suspension is in the range of from 3.0 to 4.0 and that when a sodium salt other than sodium bicarbonote is formed as a by-product, the alkalinity coefficient U' represented by the following formula:

$$U' = (1.5X - Z/3S) \quad (M)$$

wherein

X stands for the amount (moles) of the sodium carbonate as $Na_2O$ in the suspension, Z stands for the amount (moles) of the calcium compound as CaO and S stands for the amount (moles) of $H_2O$ in the suspension, is in the range of from 0.002 to 0.01 and when a sodium salt other than sodium bicarbonate is not formed as a by-product, the alkalinity coefficient U' represented by the following formula:

$$U' = (1.5X - 4Z/3S) \quad (N)$$

wherein

X, Z and S are as defined above, is in the range of from 0.002 to 0.01.

21. A process for the preparation of potassium calcium silicate in the fibrous form, which comprises adding a silicon dioxide component, potassium carbonate and a water-soluble calcium compound to an aqueous medium and subjecting the resulting aqueous suspension to hydrothermal reaction at a temperature of 150° to 250° C. under pressure, wherein the amounts of said three components are adjusted so that the silicon dioxide component/calcium compound molar ratio as $SiO_2/CaO$ in the suspension is in the range of from 3.0 to 4.0 and that when a potassium salt other than potassium bicarbonate is formed as a by-product, the potassium carbonate/calcium compound molar ratio as $K_2O/CaO$ in the suspension is in the range of from 4 to 12 and when a potassium salt other than potassium bicarbonate is not formed, the potassium carbonate/calcium compound molar ratio as $K_2O/CaO$ in the suspension is in the range of from 2 to 10.

22. A process according to claim 10 wherein the silicon dioxide component is at least one member selected from the group consisting of hydrous silica and quartz.

23. A process according to claim 10 wherein the silicon dioxide component is at least one member selected from the group consisting of $RSiO_2$ in which R is Na or K and siliceous terra abla.

24. A process according to claim 10 wherein the calcium component is at least one member selected from the group consisting of $Ca(OH)_2$, CaO, $CaCl_2$, $Ca(NO_3)_2$ and $CaSO_4$.

25. A process according to claim 10 wherein the alkali calcium silicate obtained by the hydrothermal reaction is collected by filtration, and a part or all of the filtrate is recycled to the reaction system as it is or after removal of the alkali metal salt formed as a by-product, and used as the starting material.

26. A drying agent comprising an alkali calcium silicate set forth in claim 1.

27. An ion-exchange agent comprising an alkali calcium silicate set forth in claim 1.

28. An alkali calcium silicate which has substantially the same X-ray diffraction pattern as that shown in FIG. 2 and has a composition represented by the following formula:

$$(2.5-3.5)R_2O.(7-9)CaO.32SiO_2.mH_2O)$$

wherein

R stands for at least one alkali metal selected from the group consisting of sodium and potassium, and m is a number of from 0 to 30, said alkali calcium silicate being composed of fibrous crystals having a length of 20 to 300μ and an aspect ratio of 50 to 200.

29. An alkali calcium silicate which has substantially the same X-ray diffraction pattern as that shown in FIG. 2 and has a composition represented by the following formula:

$$(2.5-3.5)R_2O.(7-9)CaO.32SiO_2.mH_2O$$

wherein

R stands for at least one alkali metal selected from the group consisting of sodium and potassium, and m is a number of from 0–30, said alkali calcium silicate being composed of micaceous flake crystals having a length of 5 to 100μ in one direction and a thickness of 0.05 to 0.2μ.

* * * * *

UNITED STATES PATENT AND TRADEMARK OFFICE
CERTIFICATE OF CORRECTION

PATENT NO. : 4,277,457
DATED : July 7, 1981
INVENTOR(S) : Genji Taga, et al.

It is certified that error appears in the above—identified patent and that said Letters Patent is hereby corrected as shown below:

Page 1, item [30], line 6, should read as follows:

Dec. 25, 1978 [JP] Japan .......... 53/158639

Claim 16, line 8, delete "sujbected" and insert -- subjected --

Claim 17, line 1, delete "carbon" and insert -- calcium --

Signed and Sealed this

Tenth Day of November 1981

[SEAL]

Attest:

GERALD J. MOSSINGHOFF

Attesting Officer    Commissioner of Patents and Trademarks